(12) United States Patent
Ogawa et al.

(10) Patent No.: US 8,393,438 B2
(45) Date of Patent: Mar. 12, 2013

(54) SOUND ABSORBING MATERIAL, MULTILAYER SOUND ABSORBING MATERIAL, MOLDED PRODUCT OF MULTILAYER SOUND ABSORBING MATERIAL, SOUND ABSORBING INTERIOR MATERIAL, AND SOUND ABSORBING FLOOR COVERING MATERIAL

(75) Inventors: Masanori Ogawa, Tokai (JP); Makoto Fujii, Tokai (JP); Naohiro Mizutani, Tokai (JP)

(73) Assignee: Nagoya Oilchemical Co., Ltd., Aichi (JP)

( * ) Notice: Subject to any disclaimer, the term of this patent is extended or adjusted under 35 U.S.C. 154(b) by 0 days.

(21) Appl. No.: 13/122,287

(22) PCT Filed: Mar. 18, 2009

(86) PCT No.: PCT/JP2009/055234
§ 371 (c)(1),
(2), (4) Date: Apr. 1, 2011

(87) PCT Pub. No.: WO2010/038491
PCT Pub. Date: Apr. 8, 2010

(65) Prior Publication Data
US 2011/0186381 A1    Aug. 4, 2011

(30) Foreign Application Priority Data

Oct. 2, 2008   (JP) .................................. 2008-257350
Feb. 5, 2009   (WO) .................. PCT/JP2009/051963

(51) Int. Cl.
*E04B 1/82*       (2006.01)

(52) U.S. Cl. ........................................ 181/290; 181/286
(58) Field of Classification Search .................. 181/210, 181/286, 290
See application file for complete search history.

(56) References Cited

U.S. PATENT DOCUMENTS

| 6,133,170 A * | 10/2000 | Suenaga et al. ............... 442/334 |
| 6,955,845 B1 | 10/2005 | Poole et al. |
| 7,080,712 B2 * | 7/2006 | Tsuiki et al. .................. 181/204 |

FOREIGN PATENT DOCUMENTS

| JP | 5-43198 | * | 6/1993 | .................... 181/290 |
| JP | 10-254452 |   | 9/1998 | |
| JP | 2000-112482 |   | 4/2000 | |
| JP | 2004-148906 |   | 5/2004 | |

(Continued)

OTHER PUBLICATIONS

English translation of JP 2006-317805, accessed Aug. 16, 2012.*

(Continued)

*Primary Examiner* — Jeremy Luks

(57) ABSTRACT

The object of the present invention is to provide a sound absorbing material having a light weight and excellent sound absorbing performance, and a sound absorbing material consisting of a fiber sheet made of fibers containing at least 50% by mass of a porous fiber having many minute pores, each minute pore opening onto the surface of the porous fiber, and having an airflow resistance in the range of between 0.05 and 3.0 kPa·s/m.

The porous fiber having many minute pores, each one opening onto the surface of the porous fiber, has air-permeability, and so a sound absorbing property in itself, and a sheet made of the porous fiber having air-permeability and sound absorbing property has even further sound absorbing properties created by the spaces between the porous fibers, resulting in the sheet becoming a sound absorbing material with extremely great sound absorbing efficiency.

20 Claims, 8 Drawing Sheets

FOREIGN PATENT DOCUMENTS

| | | |
|---|---|---|
| JP | 2006-317805 | 11/2006 |
| JP | 2008-12783 | 1/2008 |

OTHER PUBLICATIONS

English translation of JP 10-254452, accessed Aug. 16, 2012.*
English translation of JP 2004-148906, accessed Aug. 16, 2012.*
English translation of JP 2008-012783, accessed Aug. 16, 2012.*
International Search Report in PCT/JP2009/055234.

* cited by examiner (a)

(b)

(c)

(d)

SOUND ABSORBING MATERIAL, MULTILAYER SOUND ABSORBING MATERIAL, MOLDED PRODUCT OF MULTILAYER SOUND ABSORBING MATERIAL, SOUND ABSORBING INTERIOR MATERIAL, AND SOUND ABSORBING FLOOR COVERING MATERIAL

FIELD OF THE INVENTION

The present invention relates to a sound absorbing material or a multilayered sound absorbing material to be used for such as the floor material of a car, wall material of a house, and so on.

BACKGROUND OF THE INVENTION

In recent years, as a countermeasure to the depletion of the earth's oil resources, and global warming, the improvement of fuel consumption has become of great importance to the automobile industry in particular, at the same time, various sound absorbing materials has been provided for the sound proofing of the interiors/exteriors of automobiles, in an effort to reduce noise. As said sound absorbing material, a molded laminated material obtained by molding a laminated material, consisting of a sound absorbing base material and a surface material laminated thereon and into a prescribed shape, has generally been used.

As common material used in said sound absorbing material, a porous material, for instance, a fiber sheet such as nonwoven fabric, a porous material such as glass wool, foamed polyurethane or the like has been used. Further, to maximize the sound absorbing and insulating performance of the final product for various frequencies, it has been known that the airflow resistance should be adjusted to be in the range of between about 0.6 and 20.0 kPa·s/m.

For instance, Patent Literature 1 discloses a sound absorbing felt made of a single layered felt. Further, Patent Literature 2 discloses an automotive interior finishing material consisting of a fiber web to which a synthetic resin binder is attached. Further, Patent Literature 3 discloses an automotive insulation material consisting of a laminated material of a sound absorbing material made from a fiber aggregate and a surface material made from a foamed material.

Patent Literature 1; Tokkai 2005-195989
Patent Literature 2; Tokkai 2004-325973
Patent Literature 3; Tokkai 2003-081028

DISCLOSURE OF THE INVENTION

Subjects to be Solved by the Invention

The aforementioned prior inventions, however, have problems described as follows. For instance, the sound absorbing material used in a car or building wall is made of a porous material such as a fiber sheet, foamed plastic, or the like, as aforementioned; the thickness of said sound absorbing material should be increased to ensure the preferable sound absorbing performance, resulting in considerable increase in the weight of said sound absorbing material. Such a weight increase in said sound absorbing material results in a deterioration of workability and especially in the case of a car, obstructs fuel savings and weight reduction. Concretely, in the case of the invention of Patent Literature 1, the airflow resistances of one side of said felt and the other side of said felt are successively changed by adjusting coating amount of the synthetic resin binder, and as a result, the weight of said sound absorbing felt may increase to 1500 g/m$^2$. Further, said interior finishing material of the invention of Patent Literature 2 also eventually has a heavy weight of 1750 g/m$^2$. Still further, although said insulation material of the invention of Patent Literature 3 has light weight, but said insulation material has a surface layer made of a foamed material with poor surface strength.

Accordingly, the present invention was created with a focus on the problems of said prior arts, the object of the present invention being to provide a sound absorbing material having good moldability that can be used for various applications, while maintaining a good sound absorbing performance, and enabling weight reduction, and further the object of the present invention is to provide a multilayered sound absorbing material using said sound absorbing material.

The Means to Solve the Problems

The present invention provides a sound absorbing material consisting of a fiber sheet made from fibers containing at least 50% by mass of a porous fiber having many minute pores, each minute pore opening onto the surface of said fiber, said sound absorbing material having an airflow resistance in the range of between 0.05 and 3.0 kPa·s/m.

As preferable fiber, a porous pulp fiber having a beating or refining degree in the range of between 350 and 650 ml on the basis of Canadian Standard Freeness (CFS) provided in JIS P 8121-1995-4 Canadian Standard Freeness and/or in the range of between 15 and 30° SR on the basis of Schopper-Riegler Freeness provided in JIS P 8121-1995-5 Schopper-Riegler Type Freeness Test Method may be illustrated. Further, said porous fibers may be porous acrylonitrile fibers obtained by wet spinning an acrylonitrile polymer to make a yarn, stretching said yarn and carrying out the wet-heating treatment on the resulting wet stretched yarn at a temperature of between 120 and 150° C.

Said fiber sheet preferably has contraction and expansion properties by carrying out crepe processing on said fiber sheet to provide a crepe processed fiber sheet having a creping degree in the range of between 10 and 50%, and/or carrying out embossing on said fiber sheet to provide an embossed fiber sheet having many projections, the height of each projection being in the range of between 0.02 and 2.00 mm, with the number of said projections being between 20 and 200 projections/cm$^2$, and air-flow resistance of said fiber sheet may be adjusted by coating and/or impregnating, and/or mixing a synthetic resin, and/or a synthetic resin precursor on and/or into said fiber sheet. Further, fiber sheet may appropriately be colored to conceal the color of the under layer which said fiber sheet is covers.

Further, the present invention provide a multilayered sound absorbing material, wherein said fiber sheet(s), which is (are) sound absorbing material(s), is (are) laminated onto one or both sides of a porous sheet, and a multilayered sound absorbing material, wherein porous sheets are laminated onto both sides of said fiber sheet, which is sound absorbing material.

In said multi-laminated sound absorbing material, said fiber sheet and said porous sheet are bonded together through an air-permeable adhesive layer, the airflow resistance of the resulting multilayered sound absorbing material preferably being in the range of between 0.08 and 6.0 kPa·s/m.

Further, a synthetic resin and/or a synthetic resin precursor may be coated and/or impregnated and/or mixed on and/or into said porous sheet.

Still further, the present invention provides a molded multilayered sound absorbing material, wherein said multilayered sound absorbing material is molded into a prescribed shape.

Further, the present invention provides a sound absorbing interior finishing material consisting of a laminated material, wherein said multilayered sound absorbing material, or said molded multilayered sound absorbing material is used as a surface material, and said surface material is laminated onto the surface of a porous base sheet, with an air-permeable adhesive layer, wherein the airflow resistance of said laminated material is in the range of between 0.08 and 6.0 kPa·s/m, and the present invention also providing a sound absorbing floor covering material consisting of a carpet onto the backside of which said multilayered sound absorbing material, or said molded multilayered sound absorbing material is laminated.

Effectiveness of the Invention

[Action]

Said porous fiber having many minute pores, opening onto the surface of said fiber, has air permeability and a sound absorbing property in itself, and said sheet, made of said fibers containing at least 50% by mass of said porous fibers with air-permeability and a sound absorbing property, also has air-permeability, and a sound absorbing property caused by the spaces formed between said porous fibers, and as a result, said sheet becomes a highly effective sound absorbing material.

A preferable porous fiber, having many minute pores, opening onto the surface of said fiber, may be temperately beaten or refined pulp fiber.

The airflow resistance of said fiber sheet may be set to be in the range of between 0.05 and 3.0 kPa·s/m. In a case where the airflow resistance of said fiber sheet is below 0.05 kPa·s/m, the density of said fiber sheet may become excessively low, deteriorating the strength and rigidity of said fiber. Further, in a case where the airflow resistance is beyond 3.0 kPa·s/m, the density of said fiber sheet may become excessively high, giving said fiber sheet a poor sound absorbing property, and inferior moldability.

Beating the pulp fiber mechanically to grind the pulp fiber is called "beating" or "refining". In a case where the pulp fiber is beaten or refined, said fiber is branched off to be fibrillated, and concentrically loosened, resulting in said fiber becoming porous.

In a case where paper which is a kind of fiber sheet is made, using said porous pulp fiber beaten or refined in said state, the resulting paper has a low density and an excellent sound absorbing property since said paper can acquire expanded spaces between the fibers in said paper, so that a fiber sheet (paper) having a low density and excellent sound absorbing property is obtained.

However, in a case where beating or refining degree of said pulp fiber is below 350 ml on the basis of Canadian Standard Freeness (CSF) provided in JIS P 8121-1995-4 Canadian Standard Freeness, or beyond 30° SR on the basis of Shopper-Riegler Freeness provided in JIS P 8121-1995-5 Shopper-Riegler Type Freeness Test Method, the fibrillation of the resulting porous pulp fiber will advance excessively, resulting in said fiber becoming excessively fractionated, and the number of minute fibers may increase in said fiber sheet, which is paper, resulting in high density of said fiber sheet, which is paper, to deteriorate the sound absorbing property of said fiber sheet. On the other hand, in a case where beating or refining degree of said pulp fiber is beyond 650 ml (CSF) or below 15° SR, the fibrillation and concentrical loosening of said fiber will be insufficient, and as a result, the pore forming of said pulp fiber may be insufficient to reduce the degree of porosity of said fiber, giving the resulting fiber sheet a deteriorated sound absorbing property.

In a case where crepe processing is carried out on said fiber sheet to provide a crepe processed fiber sheet with a creping degree in the range of between 10 and 50%, and/or the embossing is carried out on said fiber sheet to provide an embossed fiber sheet having innumerable projections, wherein the height of each projection is in the range of between 0.02 and 2.00 mm, with the number of said projections being between 20 and 200 projections/cm$^2$, the resulting uneven surfaced fiber sheet will have improved contraction and expansion properties, so that deep draw molding can be applied to said fiber sheet, and further, when the sound waves are effected onto said fiber sheet, said fiber sheet may vibrate, being resonant with said sound waves, resulting in damping said sound waves improving the sound absorbing property of said fiber sheet.

In a case where a synthetic resin and/or a synthetic resin precursor (described in the following merely as a synthetic resin etc.) is (are) coated, and/or impregnated, and mixed on/into said fiber sheet, the rigidity of said fiber sheet will be improved, and the airflow resistance can be voluntarily adjusted to be in the range of between 0.05 and 3.0 kPa·s/m. In the case of coating, said synthetic resin etc. is coated with a sprayer, brush, roller, or the like, and in the case of impregnating, said fiber sheet is dipped in the liquid or solution of said synthetic resin etc. or said synthetic resin etc. is impregnated into said fiber sheet, or in the case of mixing, said synthetic resin etc. is mixed into a pulp slurry. In a case where said fiber sheet is appropriately colored, it will prevent the color of the under layer, onto which said fiber sheet is placed, from being seen through said fiber sheet.

In a case where said fiber sheet(s) is (are) laminated onto one or both sides of said porous sheet, or said porous sheets are laminated onto both sides of said fiber sheet to be a multilayered sound absorbing material, the resulting multilayered sound absorbing material will have an excellent sound absorbing performance even if the thickness of said porous material is thinned or the unit weight of said porous material is reduced for the weight reduction of said multilayered sound absorbing material, and also for purpose of reducing costs, and in a case where said fiber sheet and said porous sheet are bonded together through an air-permeable adhesive layer, the air-permeability of said multilayered sound absorbing material is not obstructed by said adhesive layer, so that even in a case where the unit weight of said porous sheet is reduced to be in the range of between 30 and 600 g/m$^2$, a multilayered sound absorbing material having an airflow resistance in the range of between 0.08 and 6.0 kPa·s/m and a desirable sound absorbing property is obtained.

In the case where a synthetic resin and/or a synthetic resin precursor is (are) coated, and/or impregnated, and/or mixed on/into said porous sheet, the resulting multilayered sound absorbing material achieves rigidity, moldability and molded shape stability, and further, the airflow resistance of said multilayered sound absorbing material can easily be adjusted to be in the range of between 0.08 and 6.0 kPa·s/m.

Said multilayered sound absorbing material may be molded into a prescribed shape, and said multilayered sound absorbing material or said molded multilayered sound absorbing material can be laminated onto the surface of a porous base sheet as a surface material, and by adjusting the airflow resistance of the resulting laminated material to be in the range of between 0.08 and 6.0 kPa·s/m, a sound absorbing material for an automobile, or the like, having an excellent sound absorbing performance is provided, and in a case where said multilayered sound absorbing material or said molded multilayered sound absorbing material is arranged, for instance, on the backside of a carpet, a sound absorbing floor covering material for an automobile, or the like having an excellent sound absorbing performance is provided.

EFFECTIVENESS OF THE INVENTION

In the present invention, a sound absorbing material and a multilayered sound absorbing material, having a reduced thickness, light weight, and excellent sound absorbing performance, are provided, and in a case where said sound absorbing material and said multilayered sound absorbing material are used, a sound absorbing interior finishing material, a sound absorbing floor covering material for an automobile, or the like, being both light weight and having an excellent sound absorbing performance, are provided.

Figure 1:
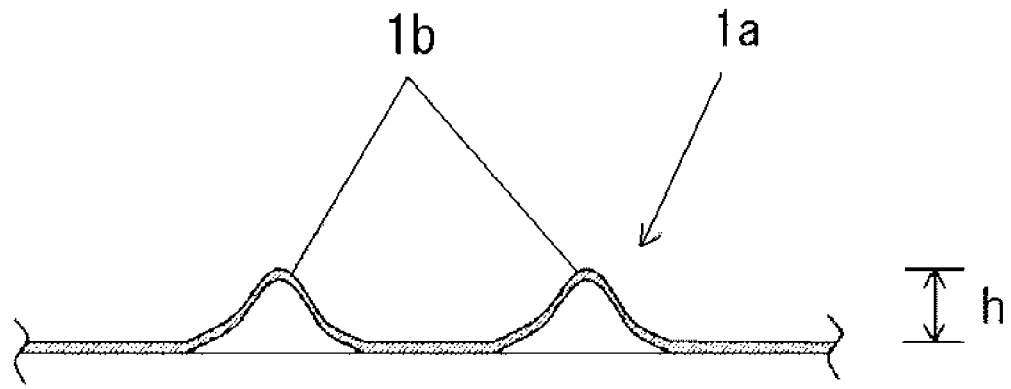
FIG. 1 is a drawing to illustrate the height h of the projection.

| DESCRIPTION OF NUMBERS ATTACHED IN DRAWINGS | |
|---|---|
| 1, 11 | Sound absorbing materials |
| 2, 21, 22 | Porous sheets |
| 3, 31, 32, 33 | multilayered sound absorbing materials |
| 5 | Sound absorbing interior material |
| 61A, 61B 61C, 61D | Floor materials for automobiles (Sound absorbing floor material) |
| 7 | Carpet |
| 8 | Polyethylene backing layer |

BEST MODE FOR CARRYING OUT THE INVENTION (Porous Fiber)

The porous fiber used in the present invention is defined as a fiber having many of minute pores opening onto the surface of said fiber itself. Said porous fiber may be such as a pulp fiber beaten or refined moderately, a porous acrylonitrile group fiber obtained by wet-spinning an acrylonitrile group polymer to make yarn, stretching said yarn and carrying out the wet-heating treatment on the resulting wet stretched yarn (Tokkai Hei 5-311508), a porous polyester fiber obtained by spinning a polyester polymer into which water soluble minute particles or alkali soluble minute particles are dispersed to make yarn and eluting said water soluble minute particles or said alkali soluble minute particles from the resulting yarn, or the like. Said porous fiber may include a tube like hollow fiber having many continuous minute pores penetrating from hollow core part to the surface of said fiber.

A preferable porous fiber as the material for said sound absorbing material is said pulp fiber, beaten or refined moderately.

Said porous pulp fiber is made of a non-woody vegetable fiber or a woody fiber, with chips of a conifer wood or a broad-leaved tree commonly being used as raw material, the degree of beating or refining of said fiber being set to be in the range of between 350 and 650 ml on the basis of Canadian Standard Freeness (CFS) provided in JIS P 8121-1995-4 Canadian Standard Freeness and/or in the range of between 15 and 30° SR on the basis of Schopper-Riegler Freeness in JIS J8121-1995-5 Schopper-Riegler Type Freeness Test Method.

Said beating or refining of said fiber is commonly carried out using a conical refiner, disk refiner, or the like. In a case where the degree of beating or refining of said pulp fiber is beyond 650 ml (CSF) and/or below 15° SR, the fibrillation of the resulting porous pulp fiber and concentrical loosening of said fiber will be insufficient, as a result, the pore forming of said fiber will also become insufficient to reduce the degree of its porosity, having a negative effect on the sound absorbing performance of the resulting sound absorbing material. On the other hand, in a case where the degree of beating or refining of said pulp fiber is below 350 ml (CSF) and/or beyond 30° SR, the fibrillation of the resulting porous pulp fiber will advance excessively, so that said fiber is excessively fractionated, and the number of minute fibers in said fiber sheet, which is paper, may increase, resulting in the high density of said fiber sheet, which is paper, thus deteriorating the sound absorbing property of said fiber sheet.

Two or more kinds of said porous fibers may be used together in the present invention, and a mixture of said porous fibers and the ordinary fibers (non porous fiber) may also be used in the present invention. In this case, said porous fibers should be contained in an amount of more than 50% by mass, more preferably more than 65% by mass, and ideally more than 80% by mass in said fiber mixture.

(Ordinary Fiber)

The ordinary fiber (non porous fiber) used for the present invention includes a synthetic fiber such as polyester fiber, polyethylene fiber, polypropylene fiber, polyamide fiber, acrylic fiber, urethane fiber, polyvinyl chloride fiber, polyvinylidene chloride fiber, acetate fiber, or the like, a biodegradable fiber made of starch extract from a plant such as corn, sugarcane, or the like, a natural fiber such as pulp, cotton, palm fiber, hemp fiber, bamboo fiber, kenaf fiber, or the like, an inorganic fiber such as glass fiber, carbon fiber, ceramic fiber, asbestos fiber, or the like, a reclaimed fiber obtained by the defibrating of the scrap of the fiber product made of said fiber, or the like, and said fiber is used singly or two or more kinds of fiber may used in said fiber aggregate, and in a case where the heat resistant synthetic fiber having a high temperature melting point preferably higher than 250° C., like an inorganic fiber such as glass fiber, carbon fiber, ceramic fiber, asbestos fiber, stainless fiber, or the like, an aramid fiber such as poly (m-phenylene isophthalamide) fiber, poly (p-phenylene terephthalamide) fiber, or the like, a polyarylate fiber, polyetheretherketone fiber, polyphenylene sulfide, or the like is (are) used, a fiber sheet having an extremely high heat resistance can be provided. In said highly heat resistant fiber, the carbon fiber is especially useful, since used or scrapped carbon fiber can be treated by incineration, and further, the fragments of the carbon fiber don't fly around, and aramid fiber is also an especially useful fiber, since it is comparatively inexpensive and easily available.

[Fiber Sheet Used as a Sound Absorbing Material]

Said sound absorbing material of the present invention may be obtained by using a fiber sheet made of fibers containing said porous fiber.

As aforementioned, said fiber sheet may be a paper, or a nonwoven fabric made of fibers containing porous fibers such as said porous pulp fibers, porous acrylonitrile group fibers, porous polyester fibers, a fiber mixture thereof, or the like, with the airflow resistance of said fiber sheet being set to be in the range of between 0.05 and 3.0 kPa·s/m.

In a case where the airflow resistance of said fiber sheet is below 0.05 kPa·s/m, the resulting fiber sheet will have an excessively low density, deteriorating the strength and the rigidity of said fiber sheet. On the other hand, in a case where the airflow resistance of said fiber sheet is beyond 3.0 kPa·s/m, the resulting fiber sheet will have an excessively high density, deteriorating the sound absorbing property and the moldability of said fiber sheet.

If desired, said fiber sheet may be crepe processed and/or embossed on its surface, the unevenness formed therefrom, such as wrinkles and projections, producing stretchability.

Said creped fiber sheet is manufactured by processing crepes on a green paper. Said crepe processing includes the wet creping process, wherein wet paper is compressed longitudinally (along the papering direction) with a press roll, doctor blade, or the like, for wrinkling, and the dry creping process wherein the green paper is dried with a Yankee drier or calendar, after which the resulting dried green paper is compressed longitudinally with a doctor blade or the like, for wrinkling. For instance, the degree of creping of said creped fiber sheet is preferably in the range of between 10 and 50%.

Herein said degree of creping is defined by the following formula.

$$\text{Degree of creping (\%)} = (A/B) \times 100$$

wherein A is the papering speed in the papering process, and B is the rolling speed of the paper.

Or $$\text{Degree of creping (\%)} = (A'/B') \times 100$$

wherein A' is the length before crepe processing, and B' is the length after crepe processing.

In other words, said degree of creping is the longitudinal (along the papering direction, in the case of paper) degree of compression of the fiber sheet (made from porous fiber) (See Tokkai 2002-327399, Tokuhyouhei 10-510886).

In a case where the degree of creping is below 10%, the sound absorbing performance of said creped fiber sheet will not improve sufficiently, and the stretchability of said creped fiber sheet will become inadequate so that said creped fiber sheet having a degree of creping below 10% will have difficulty being deep draw molded. On the other hand, said creped paper having a degree of creping beyond 50% is also apt to wrinkle during molding.

Said embossed fiber sheet is manufactured by pressing an embossing roll or plate having an uneven surface which is formed by carving or etching (embossing roll, embossing plate) onto the green fiber sheet to form a number of projections on the surface of said green fiber sheet, the height of said projections, preferably being in the range of between 0.02 and 2.00 mm, and the number of said projections preferably being in the range of between 20 and 200 projections/cm². In a case where the height of said projections is below 0.02 mm, the sound absorbing performance of said embossed fiber sheet will not improve sufficiently, and the stretchability of said embossed fiber sheet will become inadequate, so that said embossed fiber sheet having projections the height of which is below 0.02 will have difficulty being deep draw molded. On the other hand, said embossed fiber sheet having projections the height of which is beyond 2.00 mm is also apt to wrinkle during molding. In a case where the number of projections is below 20 projections/cm², the sound absorbing performance of said embossed fiber sheet will improve sufficiently. On the other hand, in a case where the number of projections is beyond 200 projections/cm², the sound absorbing performance of said embossed fiber sheet will not improve. In FIG. 1, a number of projections 1b are formed on the surface of said embossed fiber sheet 1a and the height of said projections is expressed as "h" in FIG. 1.

Further, in the process of embossing, said creped paper is used as the green paper to obtain said embossed and creped paper.

The unit weight of said fiber sheet is preferably set to be in the range of between 10 and 50 g/m². In a case where the unit weight of said fiber sheet is below 10 g/m², the resulting sheet's strength will be deteriorated, so that said sheet is apt to tear during molding, and on the other hand, when the unit weight of said fiber sheet is beyond 50 g/m², said fiber sheet's weight will be too much so that the weight reduction of the sound absorbing material can not be realized using said fiber sheet, and further said sheet will have a deteriorated moldability, so that said fiber sheet will be apt to wrinkle during molding.

The air-flow resistance of said fiber sheet is in the range of between 0.05~3.0 kPa·s/m.

Figure 2:
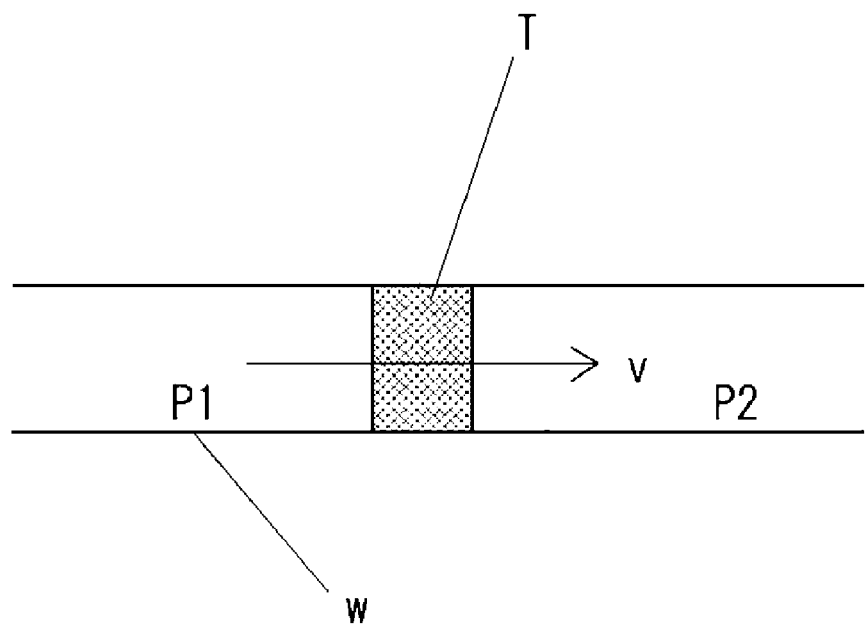
FIG. 2 is a drawing to illustrate the method of the measurement of airflow resistance.

Said air-flow resistance R (Pa·s/m) is a barometer expressing the air-permeable material's degree of permeability. To measure said air-flow resistance R, the steady flow differential-pressure measuring method may be applied. As shown in FIG. 2, a test piece T is arranged in a cylindrical duct W, and then air is blown into said duct at a constant flow V as shown by the arrow, to measure the difference in pressure between said duct's inlet side P1, and outlet side P2. The air-flow resistance is calculated using the following formula.

$$R = \Delta P/V$$

Wherein ΔP is the difference in pressure Pa(ΔP=P1·P2), and V represents the volume of airflow in said unit cross section area of said duct (m³/m²·s).

Said air-flow resistance can be measured with such as the air-flow tester (Trade Name: KES-F8-AP1, KATO TECH CO., LTD. The steady flow differential pressure measuring method).

The air flow resistance of said fiber sheet is properly settled corresponding to the necessary frequency of the object sound waves to be absorbed by the final product. The adjustment of the airflow resistance may be controlled by the beating or refining degree of the fiber sheet's pulp fibers, the entanglement said fibers to each other, unit weight, creping degree, and the resin amount to be coated, and/or impregnated, and/or mixed whereon or in.

[Porous Sheet]

Said fiber sheet(s) which is (are) the sound absorbing material(s) of the present invention may be laminated onto one or both sides of a porous sheet, or said porous sheets may be laminated onto both sides of said fiber sheet. In the present invention, a fiber sheet is commonly used as a porous sheet.

(Fiber Sheet Used as a Porous Sheet)

Said fiber sheet used as a porous sheet may be made of ordinary fibers as used in said fiber sheet, as said sound absorbing material of the present invention, however, just like said fiber sheet used as said sound absorbing material, said fiber sheet containing said porous fiber in an amount of beyond 50% by mass, may be used as said porous sheet.

Regarding the fiber sheet used as said porous sheet, a thermoplastic fiber having a melting point below 180° C. may be partially or wholly used as said fiber.

Said thermoplastic fiber having a low melting point may be such as a thermoplastic fiber having a low melting point may be such as a thermoplastic fiber having a melting point below 180° C. such as a polyolefin group fiber such as polyethylene, polypropylene, ethylene-vinyl acetate copolymer, ethylene-ethyl acrylate copolymer, or the like, polyvinyl chloride fiber, polyurethane fiber, polyester fiber, copolymerized polyester fiber, polyamide fiber, copolymerized polyamide fiber, or the like. Said thermoplastic fiber having a low melting point may be used singly, or two or more kinds of said thermoplastic fiber having a low melting point may be used together. The fineness of said thermoplastic fiber having a low melting point is preferably in the range of between 0.1 and 60 dtex. In the present invention, a core-sheath type composite fiber is preferably used, wherein an ordinary fiber is the core component, and a thermoplastic resin having a low melting point in the range of between 100° C. and 180° C. is the sheath component. In a case where said core-sheath type composite fiber is used as the fiber for said fiber sheet, the rigidity and heat resistance of said fiber sheet do not degrade.

Said fiber sheet used as said porous sheet in the present invention is manufactured by various methods such as the method, wherein a sheet or mat of said fiber web is needle-punched to entangle the fibers in said sheet or mat together, the spunbond method, or the thermal bond method, wherein, in a case where said sheet or mat of said fiber web consists of said low melting point thermoplastic fiber, or said low melting point thermoplastic fiber is mixed into said web, said sheet or mat is heated to soften said low melting point thermoplastic fiber and bind said fibers together by melting them, or the chemical bond method wherein a synthetic resin binder is impregnated or mixed into said fiber web to bind said fibers together with said synthetic resin binder, or the method wherein said sheet or mat of said fiber web is needle punched to entangle said fibers in said sheet or mat together, following which said low melting point thermoplastic fiber is heated and softened to bind said fibers together, or the stitch bond method wherein, said sheet or mat is sewed with string, the spun lace method wherein said web is twined using a high-pressure water current, or the method wherein said synthetic resin binder is impregnated into the resulting needle-punched sheet or mat, to bind said fibers, or the method wherein said fiber is knitted or woven, or the like.

Besides said fiber sheet as said porous sheet, in the present invention, a sheet made from an air-permeable foamed plastic such as air-permeable foamed polyurethane, air-permeable foamed polypropylene, air-permeable foamed phenolic resin air-permeable foamed melamine resin, or the like may be used as a porous sheet.

The unit weight and thickness of said porous sheet of the present invention may optionally be settled as general principles, but preferably the unit weight of said porous sheet is set to be in the range of between 30 and 600 g/m², more preferably in the range of between 35 and 300 g/m², with the thickness being set to be in the range between 1 and 10 mm, more preferably in the range between 2.0 and 5.0 mm.

Multilayered Sound Absorbing Material

Said sound absorbing material(s) made of said fiber sheet(s) of the present invention may be laminated onto one or both sides of said porous sheet, or said porous sheets may be laminated onto both sides of said sound absorbing material to produce a multilayered sound absorbing material. In a case where said multilayered sound absorbing material is produced, a common solution type or aqueous emulsion type adhesive, powdery, cobweb-like, solution type, or aqueous emulsion type hotmelt adhesive or the like may be used. In a case where said powdery or cobweb-like hotmelt adhesive is used as the adhesive, the adhesive layer of said hotmelt adhesive becomes air-permeable, so that said adhesive layer formed by said powdery or cobweb like hotmelt adhesive does not obstruct the air-permeability of the resulting laminated material. In a case where solution type or aqueous emulsion type adhesive is used, said adhesive is preferably coated in dots by applying spray coating, silk screen printing, offset printing, or the like, to secure the air-permeability of the resulting laminated material.

Further, in a case where said thermoplastic fiber having a low melting point is mixed into said porous sheet or a porous base sheet as described later, said thermoplastic fiber having a low melting point can be used as an adhesive to produce said multilayered sound absorbing material using said sound absorbing material, said porous sheet or the like. A sheet made of said thermoplastic fiber having a low melting point used as an adhesive has air-permeability, so that the air-permeability of the resulting multilayered sound absorbing material is secured by the use of said thermoplastic fiber sheet as an adhesive, without any obstruction of the air-permeability of said multilayered sound absorbing material.

The airflow resistance of said multilayered sound absorbing material is preferably set to be in the range between 0.08 and 6.0 kPa·s/m, more preferably between 0.1 and 5.0 kPa·s/m. In a case where the air-flow resistance is beyond 6.0 kPa·s/m, the sound absorbing property and moldability of the resulting multilayered sound absorbing material may deteriorate.

The airflow resistance of said multilayered sound absorbing material of the present invention may be set according to frequency of sound affected on said multilayered sound absorbing material. Said airflow resistance can be adjusted by changing the degree of the porosity of said porous fiber as the material of said sound absorbing material, the degree of beating or refining of the pulp fiber in the case of paper, the degree of entanglement of said porous fibers together, the unit weight of said sound absorbing material, the creping degree in the case of a creped paper, the resin amount to be coated, and/or impregnated, and/or mixed in a case where said synthetic resin is coated, and/or impregnated, and/or mixed in/on to said sound absorbing material, and further by adjusting the air flow resistance of said porous sheet on which said sound absorbing material of the present invention is laminated or by adjusting the resin amount to be coated, and/or impregnated, and/or mixed in/on to said porous sheet. Further, in a case where the synthetic resin, coated and/or impregnated and/or mixed in/on to said sound absorbing material and/or said porous sheet, has adhesiveness, forming an adhesive layer using an adhesive may not be necessary to adhere said sound absorbing material to said porous sheet.

[Sound Absorbing Interior Finishing Material]

Figure 3:
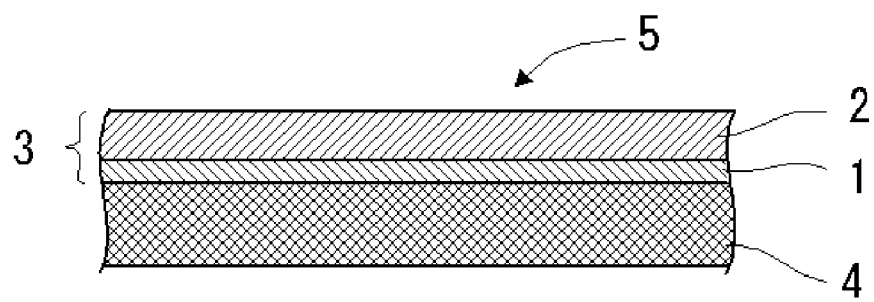
FIG. 3 is a cross sectional view of the sound absorbing interior finishing material 5.

As shown in FIG. 3, said multilayered sound absorbing material consisting of said sound absorbing material 1 and said porous sheet 2 or said molded multilayered sound absorbing material may be used as the surface material 3 of the sound absorbing interior finishing material 5 of a car, building or the like, by laminating said multilayered sound absorbing material or said molded multilayered sound absorbing material as the surface material 3 onto a porous base sheet 4. As said porous base sheet 4, the same porous sheet 2 used in said multilayered sound absorbing material may be used. The unit weight and thickness of said porous base sheet 4 may optionally be settled on general principles, but commonly, said unit weight is generally set to be in the range of between 50 and 2000 g/m², and its thickness being generally set to be in the range of between about 5 and 15 mm although the thickness of said porous base sheet 4 will vary according to the degree of compression affected on it.

Further, to adhere said multilayered sound absorbing material as the surface material 3 to said porous base sheet 4, the same adhesive and the same method as used to adhere said sound absorbing material 1 to said porous sheet 2 together in said multilayered sound absorbing material may also be applied to secure the air-permeability of said sound absorbing interior finishing material.

Further, the airflow resistance of said sound absorbing interior finishing material 5 may be changed by adjusting the airflow resistance of said porous base sheet 4, and consequently the air-flow resistance of said multilayered sound absorbing material as the surface material 3, so as to have the necessary airflow resistance of the final sound absorbing interior finishing material 5, according to the frequency of the sound which is affected on said sound absorbing interior finishing material and should be absorbed in said sound absorbing interior finishing material. Ordinarily, in a case where a low frequency sound (below 1000 Hz) is the targeted sound to be absorbed, the airflow resistance of said multilayered sound absorbing material may be set to be in the range of between about 3.0 and 6.0 kPa·s/m, in the case where a middle to high frequency (1000 to 6000 Hz) sound is the targeted sound to be absorbed, the airflow resistance of said multilayered sound absorbing material may be set to be below 3.0 kPa·s/m. The airflow resistance of said sound absorbing interior finishing material may be adjusted in the same manner as said multilayered sound absorbing material.

In said sound absorbing interior finishing material 5, in a case where said porous sheet 2 of said multilayered sound absorbing material 3 is the material through which the color of said porous base sheet 4 penetrates, (for instance, thin nonwoven fabric), the color of said porous sheet 4 will be visible through said porous sheet 2, giving said interior finishing material 5 an inferior appearance.

To avoid said problem, it is preferable that said sound absorbing material 1 be colored to conceal the color of said porous base sheet 4, concretely colored in a similar color to said porous sheet 2, for instance, in a case where said porous sheet 2 is colored in a deep color such as black, dark blue, deep red, or the like, said sound absorbing material 1 should also be colored in a deep color, and in a case where said porous sheet 2 is colored in a light color such as a tan or white color, or the like, said sound absorbing material 1 should also be colored in a light color to emphasize the color of said surface material 3, consisting of said porous sheet 2 and said sound absorbing material 1 (multilayered sound absorbing material) so as to be a deep color, which conceals the color of the under layer (porous base sheet 4), and will not show the color of said porous base sheet 4 through said surface material 3.

To add color to said sound absorbing material 1, in a case where the synthetic resin is impregnated or spray coated in/on to said sound absorbing material 1, a coloring agent may be mixed into said synthetic resin (solution type, emulsion type, dispersion type). As said coloring agent, carbon black is generally used to give a black color to said sound absorbing material 1.

In the present invention, a sound absorbing floor covering material is also provided, wherein said multilayered sound absorbing material is laminated on the backside of a carpet. In said sound absorbing floor covering material, commonly a pile layer such as cut pile layer, loop pile layer or the like is formed on the surface of the carpet, said pile layer being formed by tufting, needle punching, or electrostatic processing, or the like.

(Synthetic Resin)

As aforementioned, regarding said sound absorbing material, multilayered sound absorbing material, or sound absorbing interior finishing material of the present invention, so as to provide rigidity and moldability to said fiber sheet, and/or porous sheet, and/or porous base sheet, each being said sound absorbing material, or so as to adjust air-permeability thereof, a synthetic resin, or the like may be coated, and/or impregnated, and/or mixed therein(on). As said synthetic resin, a thermoplastic resin and/or thermosetting resin is (are) illustrated.

Said thermoplastic resin is, for instance, an acrylate resin, methacrylate resin, ionomer resin, ethylene-ethyl acrylate (EEA) resin, copolymerized acrylonitrile-styrene-acrylic rubber (ASA) resin, copolymerized acrylonitrile-styrene (AS) resin, copolymerized acrylonitrile-chlorinated polyethylene-styrene (ACS) resin, copolymerized ethylene-vinyl acetate (EVA) resin, copolymerized ethylene-vinyl alcohol (EVOH) resin, polymethylmethacrylate resin (PMMA), polybutadiene (BDR), polystyrene (PS), polyethylene (PE), copolymerized acrylonitrile-butadiene-styrene (ABS) resin, chlorinated polyethylene (CPE), polyvinyl chloride (PVC), polyvinylidene chloride (PVDC), polypropylene (PP), cellulose acetate (CA) resin, syndiotactic polystyrene (SPS), polyoxymethylene (=polyacetal) (POM), polyamide (PA), polyimide (PI), polyamide imide (PAI), polyether imide (PEI), polyarylate (PAR), thermoplastic polyurethane (TPU) elastomer, thermoplastic elastomer (TPE), liquid crystal polymer (LCP), polyether ether ketone (PEEK), polysulfone (PSF), polyether sulfone (PES), fluorocarbon polymer, polytetrafluoroethylene (PTFE), polyethylene terephthalate (PET), polycarbonate (PC), polyphenylene ether (PPE), modified PPE, polyphenylene sulfide (PPS), polybutylene terephthalate (PBT), polybenzimidazole (PBI), wholly aromatic polyester (POB), or the like. Said thermoplastic resin provides a thermoplastic sheet having an excellent retention of the molded shape, and good rigidity when said thermoplastic resin is impregnated in and/or coated on and/or mixed in to said fiber sheet, stretchable paper material, or air-permeable porous material.

Two or more kinds of said thermoplastic resin may be mixed and used together, and one or more kinds of thermosetting resin may be used together with said thermoplastic resin in a small amount so as not to hinder the thermoplasticity of said thermoplastic resin. Said thermoplastic resin is preferably provided as an aqueous solution, aqueous emulsion, or aqueous dispersion for handling, or for procedures such as impregnating, coating or the like, and may also be provided as an organic solvent solution.

Said thermosetting resin may be such as a urethane resin, melamine resin, thermosetting acrylic resin, especially a thermosetting acrylic resin which is formed into an ester bond and stiffened by heating, a urea resin, phenol resin, epoxy resin, thermosetting polyester, or the like, and further a synthetic resin precursor utilized to produce said synthetic resin may be also used. Said synthetic resin precursor may include such as a prepolymer, oligomer, and monomer such as urethane resin prepolymer, urea resin prepolymer (precondensation polymer), phenol group resin prepolymer (precondensation polymer), diallyl phthalate prepolymer, acrylic oligomer, polyatomic isocyanate, methacrylic ester monomer, diallyl phthalate monomer, or the like. For easy handling, said thermosetting resin is preferably provided as an aqueous solution, aqueous emulsion, or aqueous dispersion, and may also be provided as an organic solvent solution.

Two or more kinds of said thermosetting resin or synthetic resin precursor may be mixed and used together, The addition of said synthetic resin, especially said thermosetting resin, improves the retention of the molded shape, and rigidity of said air-permeable rigid layer and air-permeable resilient layer.

A phenol group resin is an especially preferable synthetic resin in the present invention.

Said phenol group resin is produced by the condensation of a phenol group compound, and formaldehyde and/or a formaldehyde donor.

(Phenol Group Compound)

The phenol group compound used to produce said phenol group resin may be a monohydric phenol, or polyhydric phenol, or a mixture of monohydric phenol and polyhydric phenol, but in a case where only a monohydric phenol is used, formaldehyde is apt to be emitted when or after said resin composition is cured, making polyphenol or a mixture of monophenol and polyphenol most desirable.

(Monohydric Phenol)

The monohydric phenols include an alkyl phenol such as o-cresol, m-cresol, p-cresol, ethylphenol, isopropylphenol, xylenol, 3,5-xylenol, butylphenol, t-butylphenol, nonylphenol, or the like; a monohydric derivative such as o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol, o-aminophenol, m-aminophenol, p-aminophenol, o-nitrophenol, m-nitrophenol, p-nitrophenol, 2,4-dinitrophenol, 2,4,6-trinitrophenol or the like; a monohydric phenol of a polycyclic aromatic compound such as naphthol or the like. Each monohydric phenol can be used singly, or as a mixture thereof.

(Polyhydric Phenol)

The polyhydric phenols mentioned above include resorcin, alkylresorcin, pyrogallol, catechol, alkyl catechol, hydroquinone, alkyl hydroquinone, phloroglucinol, bisphenol, dihydroxynaphthalene or the like. Each polyhydric phenol can be used singly, or as a mixture thereof. Resorcin and alkylresorcin are more suitable than other polyhydric phenols. Alkylresorcin, in particular, is the most suitable of polyhydric phenols because alkylresorcin can react with aldehydes more rapidly than resorcin.

The alkylresorcins include 5-methyl resorcin, 5-ethyl resorcin, 5-propyl resorcin, 5-n-butyl resorcin, 4,5-dimethyl resorcin, 2,5-dimethyl resorcin, 4,5-diethyl resorcin, 2,5-diethyl resorcin, 4,5-dipropyl resorcin, 2,5-dipropyl resorcin, 4-methyl-5-ethyl resorcin, 2-methyl-5-ethyl resorcin, 2-methyl-5-propyl resorcin, 2,4,5-trimethyl resorcin, 2,4,5-triethyl resorcin, or the like.

A polyhydric phenol mixture produced by the dry distillation of oil shale, which is produced in Estonia, is inexpensive, and includes 5-methyl resorcin, along with many other kinds of alkylresorcin which is highly reactive, so that said polyhydric phenol mixture is an especially desirable raw polyphenol material for the present invention.

Further, among said polyhydric phenols, one or a mixture of two or more kinds of resorcin group compound such as resorcin, alkylresorcin or the like (including a polyhydric phenol mixture produced by the dry distillation of oil shale which is produced in Estonia), and a resorcin group resin consisting of aldehyde and/or an aldehyde donor, are desirable for use as a phenol group resin in the present invention.

[Formaldehyde Donor]

In the present invention, said phenol group compound and formaldehyde and/or formaldehyde donor are condensed together. Said formaldehyde donor refers to a compound, or mixture thereof which emits aldehyde when said compound or mixture decomposes. Said aldehyde donor is such as paraformaldehyde, trioxane, hexamethylenetetramine, tetraoxymethylene, or the like. In the present invention, a formaldehyde and formaldehyde donor are combined together, hereafter to be described as a formaldehyde group compound.

[Production of Phenol Group Resin]

There are two types of said phenol group resin, one is a resol type, which is produced by the reaction between said phenol group compound and an excess amount of said formaldehyde group compound, using an alkali as a catalyst, and the other novolak type is produced by the reaction between an excess amount of said phenol group compound and formaldehyde group compound, using an acid as a catalyst. Said resol type phenol group resin consists of various phenol alcohols produced by the addition of formaldehyde to phenol, and is commonly provided as a water solution, while said novolak phenol group resin consists of various dihydroxydiphenylmethane group derivatives, wherein said phenol group compounds are further condensed with phenol alcohols, said novolak type phenol group resin being commonly provided as a powder.

As for the use of said phenol group resin in the present invention, said phenol group compound is first condensed with a formaldehyde group compound to produce a precondensate, after which the resulting precondensate is applied to said fiber sheet, thus being followed by resinification with a curing agent, and/or by heating.

To produce said condensate, a monohydric phenol may be condensed with a formaldehyde group compound to produce a homoprecondensate, or a mixture of monohydric phenol and polyhydric phenol may be condensed with a formaldehyde group compound to produce a coprecondensate of monohydric phenol and polyhydric phenol. To produce said coprecondensate, either of said monohydric phenol or polyhydric phenol may be previously condensed with said formaldehyde group compound to produce a precondensate, or both monohydric phenol and polyhydric phenol may be condensed together.

In the present invention, the desirable phenol group resin is a phenol-alkylresorcin cocondensation polymer. Said phenol-alkylresorcin cocondensation polymer provides a water solution of said cocondensation polymer(pre-cocondensation polymer) having good stability, and being advantageous in that it can be stored for a longer time at room temperature, as compared with a condensate consisting of only a phenol (precondensation polymer). Further, in a case where said sheet material is impregnated or coated with said water solution, and then precured, said fiber sheet has good stability and does not lose its moldability after longtime storage. Further, since alkylresorcin is highly reactive to a formaldehyde group compound, and catches free aldehydes to react with, the content of free aldehydes in said resin can be reduced.

The desirable method for producing said phenol-alkylresorcin cocondensation polymer is first to create a reaction between phenol and a formaldehyde group compound to produce a phenol group resin precondensate, and then to add alkylresorcin, and if desired, a formaldehyde group compound, to said phenol group resin precondensate, to create a reaction.

In the case of method for the condensation of a monohydric phenol and/or polyhydric phenol, and a formaldehyde group compound, 0.2 to 3 moles of said formaldehyde group compound is added to 1 mole of said monohydric phenol; 0.1 to 0.8 mole of said formaldehyde group compound is added to 1 mole of said polyhydric phenol, as usual. If necessary, additives may be added to the phenol resins (precondensation polymers). In said method(s), there is a condensation reaction caused by applying heat at 55 to 100° C. for 8 to 20 hours. The addition of said formaldehyde group compound may be made once, at the beginning of the reaction, or several separate times throughout the reaction, or said formaldehyde group compound may be dropped in continuously throughout said reaction.

Further, if desired, the phenol group compounds and/or precondensates thereof may be copolycondensed with amino resin monomers such as urea, thiourea, melamine, thiomelamine, dicyandiamine, guanidine, guanamine, acetoguanamine, benzoguanamine, 2,6-diamino-1,3-diamine, and/or with the precondensation polymers of said amino resin monomers, thus producing said phenol group resins.

To produce said phenol group resin, a catalyst, or pH control agent, may be mixed in, if needed, before, during, or after the reaction. Said catalyst or pH control agent is, for example, an organic or inorganic acid such as hydrochloric acid, sulfuric acid, orthophosphoric acid, boric acid, oxalic acid, formic acid, acetic acid, butyric acid, benzenesulfonic acid, phenolsulfonic acid, p-toluenesulfonic acid, naphthalene-α-sulfonic acid, naphthalene-β-sulfonic acid, or the like; an organic acid ester such as oxalic dimethyl ester, or the like; an acid anhydride such as maleic anhydride, phthalic anhydride, or the like; an ammonium salt such as ammonium chloride, ammonium sulfate, ammonium nitrate, ammonium oxalate, ammonium acetate, ammonium phosphate, ammonium thiocyanate, ammonium imide sulfonate, or the like; an organic halide such as monochloroacetic acid or its sodium salt, α,α'-dichlorohydrin, or the like; a hydrochloride of amines such as triethanolamine hydrochloride, aniline hydrochloride, or the like; a urea adduct such as salicylic acid urea adduct, stearic acid urea adduct, heptanoic acid urea adduct, or the like; an acid substance such as N-trimethyl taurine, zinc chloride, ferric chloride, or the like; ammonia; amines; a hydroxide of an alkaline metal or alkaline earth metal such as sodium hydroxide, potassium hydroxide, barium hydroxide, calcium hydroxide, or the like; an oxide of an alkaline earth metal such as lime, or the like; an alkaline substance like an alkaline metal salt of weak acid such as sodium carbonate, sodium sulfite, sodium acetate, sodium phosphate or the like.

Further, curing agents such as a formaldehyde group compound or alkylol triazone derivative, or the like, may be added to said phenol group resin precondensate (including precocondensation polymer).

Said alkylol triazone derivative is produced by the reaction between the urea group compound, amine group compound, and formaldehyde group compound. Said urea group compound used in the production of said alkylol triazone derivative may be such as urea, thiourea, an alkylurea such as methylurea or the like; an alkylthiourea such as methylthiourea or the like; phenylurea, naphthylurea, halogenated phenylurea, nitrated alkylurea, or the like, or a mixture of two or more kinds of said urea group compound. A particularly desirable urea group compound may be urea or thiourea. As amine group compounds, an aliphatic amine such as methyl amine, ethylamine, propylamine, isopropylamine, butylamine, amylamine or the like, benzylamine, furfuryl amine, ethanol amine, ethylenediamine, hexamethylenediamine hexamethylenetetramine, or the like, as well as ammonia are illustrated, and said amine group compound is used singly or two or more amine group compounds may be used together. The formaldehyde group compound(s) used for the production of said alkylol triazone derivative is (are) the same as the formaldehyde group compound(s) used for the production of said phenol group resin precondensate.

To synthesize said alkylol triazone derivatives, commonly 0.1 to 1.2 moles of said amine group compound(s) and/or ammonia, and 1.5 to 4.0 moles of said formaldehyde group compound are reacted with 1 mole of said urea group compound. In said reaction, the order in which said compounds are added is arbitrary, but preferably, the required amount of formaldehyde group compound is put in a reactor first, after which the required amount of amine group compound(s) and/or ammonia is (are) gradually added to said formaldehyde group compound, the temperature being kept at below 60° C., after which the required amount of said urea group compound(s) is (are) added to the resulting mixture at 80 to 90° C. for 2 to 3 hours, being agitated so as to react together. Usually, 37% by mass of formalin is used as said formaldehyde group compound, but some of said formalin may be replaced with paraformaldehyde, to increase the concentration of the reaction product. Further, in a case where hexamethylene tetramine is used, the solid content of the reaction product obtained is much higher. The reaction between said urea group compound, amine group compound and/or ammonia, and said formaldehyde group compound is commonly performed in a water solution, but said water may be partially or wholly replaced with one or more kinds of alcohol such as methanol, ethanol, isopropanol, n-butanol, ethylene glycol, diethylene glycol, or the like, and one or more kinds of other water soluble organic solvent, such as ketone group solvent like acetone, methylethyl ketone, or the like can also be used as solvents. The amount of said curing agent to be added is, in the case of a formaldehyde group compound, in the range of between 10 and 100 parts by mass, to 100 parts by mass of said phenol group resin precondensate (precocondensation polymer) of the present invention, and in the case of an alkylol triazone derivative, 10 to 500 parts by mass to 100 parts by mass of said phenol group resin precondensate (precocondensation polymer).

[Sulfomethylation and/or Sulfimethylation of a Phenol Group Resin]

To improve the stability of said water soluble phenol group resin, said phenol group resin is preferably sulfomethylated and/or sulfimethylated.

[Sulfomethylation Agent]

The sulfomethylation agents used to improve the stability of the aqueous solution of phenol group resins, include such as water soluble sulfites prepared by the reaction between sulfurous acid, bisulfurous acid, or metabisulfurous acid, and alkaline metals, trimethyl amine, quaternary amine or quaternary ammonium (e.g. benzyltrimethylammonium); and aldehyde additions prepared by the reaction between said water soluble sulfites and aldehydes.

The aldehyde additives are prepared by the addition reaction between said aldehydes and water soluble sulfites as aforementioned, wherein the aldehydes include formaldehyde, acetoaldehyde, propionaldehyde, chloral, furfural, glyoxal, n-butylaldehyde, caproaldehyde, allylaldehyde, benzaldehyde, crotonaldehyde, acrolein, phenyl acetoaldehyde, o-tolualdehyde, salicylaldehyde, or the like. For example, hydroxymethane sulfonate, which is an aldehyde additive, is prepared by the addition reaction between formaldehyde and sulfite.

[Sulfimethylation Agent]

The sulfimethylation agents used to improve the stability of the aqueous solution of phenol group resins, include alkaline metal sulfoxylates of an aliphatic or aromatic aldehyde such as sodium formaldehyde sulfoxylate (a.k.a. Rongalite), sodium benzaldehyde sulfoxylate, or the like; hydrosulfites (a.k.a. dithionites) of alkaline metal or alkaline earth metal such as sodium hydrosulfite, magnesium hydrosulfite, or the like; and a hydroxyalkanesulfinate such as hydroxymethanesulfinate, or the like.

In a case where said phenol group resin precondensate is sulfomethylated and/or sulfimethylated, said sulfomethylation agent and/or sulfimethylation agent can be added to said precondensate at any stage, to sulfomethylate and/or sulfimethylate said phenol group compound and/or said precondensate.

The addition of said sulfomethylation agent and/or sulfimethylation agent may be carried out at any stage, before, during or after the condensation reaction.

The total amount of said sulfomethylation agent and/or sulfimethylation agent to be added is in the range of between 0.001 and 1.5 moles per 1 mole of said phenol group compound. In a case where the total amount of said sulfomethylation agent and/or sulfimethylation agent to be added is less than 0.001 mole per 1 mole of said phenol group compound, the resulting phenol group resin will have an insufficient hydrophilic property, while in a case where the total amount of said sulfomethylation agent and/or sulfimethylation agent to be added is over 1.5 moles per 1 mole of said phenol group compound, the resulting phenol group resin will have insufficient water resistance. To maintain good performance, in such as the curing capability of said produced precondensate, and the properties of the resin after curing, or the like, the total amount of said sulfomethylation agent and/or sulfimethylation agent is preferably set to be in the range of between about 0.01 and 0.8 mole for said phenol group compound.

Said sulfomethylation agent and/or sulfimethylation agent added to said precondensate, to effect the sulfomethylation and/or sulfimethylation of said precondensate, react(s) with the methylol group of said precondensate, and/or the aromatic group of said precondensate, introducing a sulfomethyl group and/or sulfimethyl group to said precondensate.

As aforementioned, an aqueous solution of sulfomethylated and/or sulfimethylated phenol group resin precondensate is stable in a wide range, between acidity(pH1.0), and alkalinity, with said precondensate being curable within any range, acidity, neutrality, or alkalinity. In particular, in a case where said precondensate is cured in an acidic range, the remaining amount of said methylol group decreases, solving the problem of formaldehyde being produced by the decomposition of said cured precondensate.

[Flame Retardant Agent]

Further, a flame retardant may be added to said fiber sheet, and/or porous sheet, each being said sound absorbing material, of the present inventions. Said flame retardant is, for instance, such as flame retardant containing phosphorus, flame retardant containing nitrogen, flame retardant containing sulfur, flame retardant containing boron, flame retardant containing bromine, guanidine group flame retardant, phosphate group flame retardant, phosphoric ester flame retardant, amine resin group flame retardant, expandable graphite, or the like. A powdery flame retardant, which is insoluble or difficult to dissolve in water, is especially advantageous when used in the present invention.

Said powdery flame retardant, which is insoluble or difficult to dissolve in water, imparts a flame retardancy having excellent water resistance, and durability to said sound absorbing material. In particular, since said fiber sheet, and/or porous sheet, each being said sound absorbing material, of the present invention, have a thin structure, said powdery solid flame retardant can be smoothly impregnated into the inside of said fiber sheet and/or porous sheet, so that said fiber sheet, and porous sheet, each being said sound absorbing material of the present invention gain high flame retardeancy to non-flamability.

Further, in a case where a flame retardant fiber or flame proofing fiber, for instance, an inorganic fiber such as carbon fiber, glass fiber, ceramic fiber, or the like, a mineral fiber such as asbestos fiber, or the like, an aramid fiber (aromatic polyamide fiber), animal hair such as sheep wool (natural wool), or the like is used as the fiber for the fiber sheet used as said porous sheet, said sound absorbing material can acquire flame retardancy or flame-proofness without using the flame retardant described later.

Into said synthetic resin or synthetic resin precursor used in the present invention, further, the following substances may be added or mixed. Said substances include, for instance, an inorganic filler, such as calcium carbonate, magnesium carbonate, barium sulfate, calcium sulfate, calcium sulfite, calcium phosphate, calcium hydroxide, magnesium hydroxide, aluminium hydroxide, magnesium oxide, titanium oxide, iron oxide, zinc oxide, alumina, silica, colloidal silica, diatomaceous earth, dolomite, gypsum, talc, clay, asbestos, mica, calcium silicate, bentonite, white carbon, carbon black, iron powder, aluminum powder, glass powder, stone powder, blast furnace slag, fly ash, cement, zirconia powder, or the like; a natural rubber or its derivative; a synthetic rubber such as styrene-butadiene rubber, acrylonitrile-butadiene rubber, chloroprene rubber, ethylene-propylene rubber, isoprene rubber, isoprene-isobutylene rubber, or the like; a water-soluble macromolecule and natural gum such as polyvinyl alcohol, sodium alginate, starch, starch derivative, glue, gelatin, powdered blood, methyl cellulose, carboxy methyl cellulose, hydroxy ethyl cellulose, polyacrylate, polyacrylamide, or the like; an organic filler such as, wood flour, walnut powder, coconut shell flour, wheat flour, rice flour, or the like; a higher fatty acid such as stearic acid, palmitic acid, or the like; a fatty alcohol such as palmityl alcohol, stearyl alcohol, or the like; a fatty acid ester such as butyryl stearate, glycerin mono stearate, or the like; a fatty acid amide; a natural wax or composition wax such as carnauba wax, or the like; a mold release agent such as paraffin, paraffin oil, silicone oil, silicone resin, fluorocarbon polymers, polyvinyl alcohol, grease, or the like; an organic blowing agent such as azodicarbonamido, dinitroso pentamethylene tetramine, p,p'-oxibis(benzene sulfonylhydrazide), azobis-2,2'-(2-methylpropionitrile), or the like; an inorganic blowing agent such as sodium bicarbonate, potassium bicarbonate, ammonium bicarbonate or the like; hollow particles such as shirasu balloon, perlite, glass balloon, plastic foaming glass, hollow ceramics, or the like; foaming bodies or particles such as foaming polyethylene, foaming polystyrene, foaming polypropylene, or the like; a pigment; dye; antioxidant; antistatic agent; crystallizer; a flame retardant such as phosphorus group compound, nitrogen group compound, sulfur group compound, boron group compound, bromine group compound, guanidine group compound, phosphate group compound, phosphoric ester group compound, amine group resin, or the like; flameproofing agent; water-repellent agent; oil-repellent agent; insecticide agent; preservative; wax; surfactant; lubricant; antioxidant; ultraviolet absorber; a plasticizer such as phthalic ester (ex. dibutyl phthalate(DBP), dioctyl phthalate (DOP), dicyclohexyl phthalate) and others(ex. tricresyl phosphate).

A water and oil repellant agent includes such as natural wax, synthetic wax, fluorocarbon resin, silicon group resin, or the like.

To coat or impregnate said synthetic resin or the like on or into said sound absorbing material or porous sheet or porous base sheet, said sound absorbing material or porous sheet is generally impregnated with a water emulsion or water dispersion of said synthetic resin or said water emulsion or water dispersion is coated onto said sound absorbing material or porous sheet using a knife coater, roll coater, flow coater, or the like. To adjust the amount of said resin in said sound absorbing material or porous sheet into which said resin is impregnated or coated, after said resin is impregnated or coated in/on to said sound absorbing material or porous sheet, said sound absorbing material or porous sheet is squeezed using a squeezing roll, press machine, or the like.

In this case the thickness of said sound absorbing material or porous sheet is reduced, and in a case where a fiber sheet is used or said porous sheet and said fiber sheet consists of, or contains low melting point fiber, it is desirable to heat said fiber sheet and melt said low melting point fiber, so as to bind the fibers with said melted fiber, before said resin is impregnated into said fiber sheet. By doing so, the rigidity and strength of said fiber sheet as said porous sheet is further improved, so that the workability of said fiber sheet during the process of impregnating it with said resin may be improved, resulting in a remarkable restoration of the thickness of said fiber sheet after squeezing.

After said resin is impregnated or coated in/on to fiber sheet, said fiber sheet as said porous sheet is then dried at room temperature or by heating.

Said multilayered sound absorbing material, or sound absorbing interior finishing material may be molded into a prescribed shape. When said sound absorbing material, or porous sheet, or porous base sheet, which comprises said multilayered sound absorbing material, or sound absorbing interior finishing material, is coated, and/or impregnated and/or mixed with a synthetic resin, or said porous sheet or porous base sheet consists of, or contains a low melting point fiber, said multilayered sound absorbing material or sound absorbing interior finishing material is hot-pressed at a temperature lower than the melting point of said thermoplastic resin, or low melting point fiber, or after heating to a temperature higher than said melting point, and then cold-pressed.

In a case where said sound absorbing material, porous sheet, or porous base sheet is coated, and/or impregnated, and/or mixed with a thermosetting resin, said multilayered sound absorbing material or sound absorbing interior finishing material is hot-pressed at the temperature of or over the curing temperature of said thermosetting resin.

The EXAMPLES described below aim to further concretely explain the present invention, but the scope of the present invention is not limited by only said EXAMPLES.

[Manufacturing of the Sound Absorbing Material]

EXAMPLE 1

A pulp fiber material containing 90% by mass of a conifer pulp and 10% by mass of a broad-leaved tree pulp was refined with a disc-refiner to make three kinds of refined pulp fiber samples, with Canadian Standard Freeness and Shopper-Riegler Freeness respectively being 600 ml (CSF) and 16° SR, 450 ml (CSF) and 24° SR, and 400 ml (CSF) and 28° SR. Using each pulp fiber sample, the sound absorbing material samples Nos. 1 to 6 made of fiber sheets having unit weights of 18 g/m$^2$ and 35 g/m$^2$ respectively were prepared by paper making.

[Comparison 1]

The sound absorbing material samples Nos. 7 and 8 made of fiber sheets, with unit weights of 8 g/m$^2$ and 35 g/m$^2$ respectively, were prepared by paper making, in the same way as applied in Example 1, with the exception that the pulp fiber material with refining degrees of 700 ml (CFS) and 13° SR was used.

EXAMPLE 2

The sound absorbing material No. 9, made of a resin impregnated fiber sheet was prepared, using the fiber sheet of EXAMPLE 1, having refining degrees of 600 ml (CSF) and 16° SR, and a unit weight of 15 g/m$^2$, with the exception that an acrylic ester group synthetic resin emulsion was spray coated onto one side of said sound absorbing material in an amount of 20 g/m$^2$ as a solid, and then dried.

[Comparison 2]

The sound absorbing material samples Nos. 10 and 11 made of fiber sheets with unit weights of 18 g/m$^2$ and 35 g/m$^2$ respectively were prepared by paper making in the same way as applied in EXAMPLE 1 with the exception that a pulp fiber material with refining degrees of 300 ml (CFS) and 32° SR was used.

[Comparison 3]

The sound absorbing material No. 12, made of a resin impregnated fiber sheet was prepared, using the fiber sheet of COMPARISON 1, having refining degrees of 700 ml (CSF) and 13° SR, and a unit weight of 35 g/m$^2$, with the exception that an acrylic ester group synthetic resin emulsion was spray coated onto one side of said sound absorbing material in amount of 55 g/m$^2$ as a solid, and then dried.

(The Airflow Resistances of Sound Absorbing Material Samples)

The airflow resistances of sound absorbing material samples of EXAMPLES 1 and 2, and COMPARISONS 1, 2 and 3 were measured using the air-permeable tester, KES-F8-AP1 (KATO TECH CO., LTD.). The results are shown in Table 1.

TABLE 1

|  | Sound absorbing material No. | SR refining degree ° (SR) | CS refining degree (ml) | Unit weight (g/m²) | Air-flow resistance (kPa · s/m) |
|---|---|---|---|---|---|
| EXAMPLE 1 | 1 | 16 | 600 | 18 | 0.091 |
|  | 2 | 24 | 450 | 18 | 0.989 |
|  | 3 | 28 | 400 | 18 | 1.764 |
|  | 4 | 16 | 600 | 35 | 0.445 |
|  | 5 | 24 | 450 | 35 | 1.670 |
|  | 6 | 28 | 400 | 35 | 2.583 |
| COMPARISON 1 | 7 | 13 | 700 | 18 | 0.037 |
|  | 8 | 13 | 700 | 35 | 0.042 |
| EXAMPLE 2 | 9 | 16 | 600 | 38 | 0.448 |
| COMPARISON 2 | 10 | 32 | 300 | 18 | 8.36 |
|  | 11 | 32 | 300 | 35 | 19.31 |
| COMPARISON 3 | 12 | 13 | 700 | 90 | 0.426 |

Referring to Table 1, the sound absorbing material samples of COMPARISONS 1, Nos. 7 and 8, using pulp fiber material with a freeness of 700 ml (CFS) (>650 ml(CFS) and 13° SR(<15° SR) each have lower airflow resistances than 0.05 kPa·s/m. Further, the sound absorbing material samples of COMPARISON 2, Nos. 10 and 11 using pulp fiber material with freeness of 300 ml (CSF) (<350 ml(CSF)) and 32° SR(>30° SR) each have much higher airflow resistances than 3.0 kPa·s/m. In a case of sound absorbing material sample of COMPARISON 3, No. 12, using pulp fiber material with a freeness of 700 ml (CSF) and 13° SR, to adjust the airflow resistance to be in the range of between 0.05 and 3.0 kPa·s/m, a large amount of synthetic resin should be impregnated into said sound absorbing material sample, resulting in, said sound absorbing material showing a remarkable increase in its unit weight, 90 g/m².

[Manufacturing of the Multiple Layered Sound Absorbing Material]

Using a fiber mixture web made from a fiber mixture containing 70% by mass of a polyester fiber and 30% by mass of a low melting point polyester fiber (melting point:140° C.), said fiber mixture web having a unit weight of 500 g/m², said fiber mixture web was heated at 180° C. for one minute, after which then said fiber mixture web was then molded by cold pressing, to obtain an air-permeable porous sheet (A) having a thickness of 10 mm. Following this, a cobweb-like hotmelt adhesive made from a polyamide (melting pont:120° C.) having unit weight of 15 g/m² was put onto one side of said air-permeable porous sheet (A) as an air-permeable adhesive layer, after which each sound absorbing material sample obtained in EXAMPLES 1 and 2, and COMPARISONS 1, 2, and 3 was put onto said air-permeable porous sheet (A) through said air-permeable adhesive layer, and then the resulting multilayered material was lightly pressed with a hot press machine at 130° C. for 5 seconds to prepare a multilayered sound absorbing material sample. Further, as traditional comparison sound absorbing material samples, said air-permeable porous sheet (A), air-permeable porous sheet (B) having a thickness of 10 mm and using said fiber mixture web having a unit weight of 1800 g/m², and air-permeable porous sheet (C) having a thickness of 10 mm and using said fiber mixture web having a unit weight of 1000 g/m² were prepared.

[Sound Absorbing Performance Test]

Regarding each multilayered sound absorbing sample and each comparison sound absorbing material sample, the air-flow resistance and the sound absorptivity by the vertical incidence method were measured, with the results being shown in Table 2. The sound source was arranged to be at sound absorbing material side of each multilayered sound absorbing material sample.

TABLE 2

|  |  | Multilayered sound absorbing material | | Sound absorptivity by frequency using the verical incidence method (%) | | | | | | | | |
|---|---|---|---|---|---|---|---|---|---|---|---|---|
|  |  | Air-flow resistance | Unit weight | Frequency (Hz) | | | | | | | | |
|  | No. | (kPa · s/m) | (g/m²) | 400 | 800 | 1250 | 1600 | 2000 | 3150 | 4000 | 5000 | 6300 |
| EXAMPLE 1 | 1 | 0.122 | 533 | 3 | 10 | 20 | 28 | 40 | 65 | 72 | 80 | 84 |
|  | 2 | 1.005 | 533 | 6 | 15 | 30 | 40 | 48 | 75 | 86 | 93 | 97 |
|  | 3 | 1.782 | 533 | 5 | 18 | 39 | 47 | 56 | 80 | 90 | 94 | 87 |
|  | 4 | 0.461 | 550 | 5 | 13 | 24 | 35 | 44 | 70 | 81 | 90 | 92 |
|  | 5 | 1.693 | 550 | 4 | 15 | 27 | 44 | 53 | 77 | 88 | 95 | 82 |
|  | 6 | 2.601 | 550 | 8 | 20 | 45 | 60 | 75 | 85 | 90 | 84 | 80 |
| COMPARISON 1 | 7 | 0.040 | 533 | 2 | 5 | 9 | 13 | 20 | 26 | 40 | 56 | 62 |
|  | 8 | 0.047 | 550 | 2 | 6 | 13 | 19 | 24 | 32 | 41 | 58 | 67 |
| EXAMPLE 2 | 9 | 0.463 | 553 | 5 | 12 | 22 | 34 | 41 | 68 | 79 | 88 | 90 |
| COMPARISON 2 | 10 | 8.40 | 533 | 13 | 30 | 58 | 75 | 91 | 72 | 65 | 60 | 56 |
|  | 11 | 19.52 | 550 | 13 | 32 | 60 | 87 | 80 | 75 | 60 | 45 | 42 |
| COMPARISON 3 | 12 | 0.461 | 605 | 3 | 10 | 24 | 30 | 42 | 60 | 68 | 71 | 63 |
| COMPARISON SOUND ABSORPTION MATERIAL | A | 0.032 | 500 | 2 | 7 | 12 | 18 | 22 | 31 | 40 | 53 | 65 |
|  | B | 1.107 | 1800 | 5 | 15 | 26 | 33 | 45 | 70 | 82 | 92 | 95 |
|  | C | 0.226 | 1000 | 2 | 8 | 15 | 21 | 30 | 45 | 60 | 80 | 83 |

Figure 4:
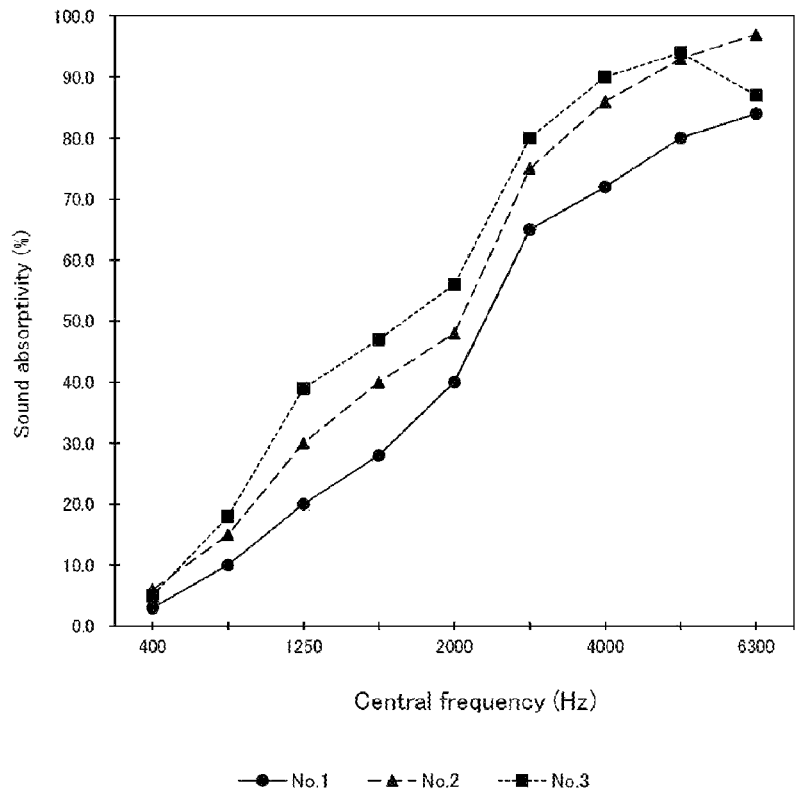
FIG. 4 is a graph showing the sound absorptivities per frequency regarding the sound absorbing materials No. 1, No. 2, and No. 3.
Figure 7:
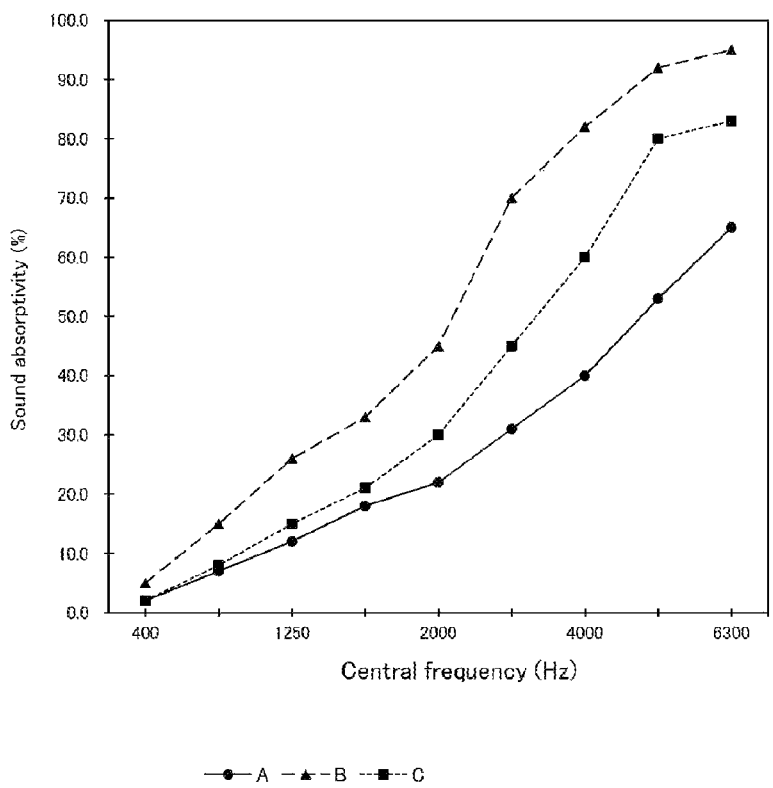
FIG. 7 is a graph showing the sound absorptivities per frequency regarding the comparison sound absorbing materials A, B and C.

The results of the sound absorbing test regarding the samples from EXAMPLE 1, COMPARISON A, B and C are shown in Table 2, FIGS. 4, and 7. Referring to the results, shown in Table and Figures, in a case where the traditional porous sheets B and C were used as sound absorbing material samples, the unit weight of the resulting multilayered sound absorbing material should be set to be about 1000 g/m² to 1800 g/m², while in the case of the multilayered sound absorbing material of the present invention, the necessary unit weight will be below 550 g/m², namely about ½ to ⅓ of the unit weight of traditional samples, to secure an identical or superior sound absorbing performance as compared with the traditional sound absorbing material.

Figure 6:
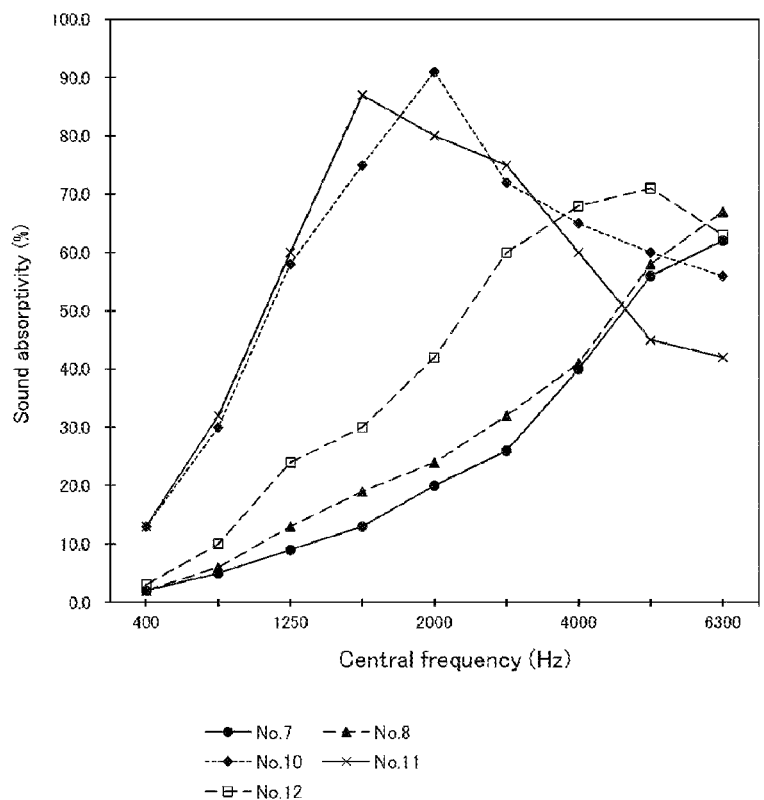
FIG. 6 is a graph showing the sound absorptivities per frequency regarding the sound absorbing materials No. 7, No. 8, No. 10, No. 11 and No. 12.

The test results of the samples in COMPARISON 1 are shown in Table 2 and FIG. 6. Referring to the results in the case of the sound absorbing material using s pulp fiber material having a refining degree of beyond 650 ml (CSF) and/or below 15° SR, the porosity of said pulp fiber material will be insufficient, so that an adequate airflow resistance can not be secured, resulting in a deteriorated sound absorbing performance, while in the case of COMPARISON 2 where the pulp fiber having a refining degree of below 350 ml (CSF) and/or beyond 30° SR is used for said sound absorbing material, said pulp fiber will become excessively fibrillated to be fractionized, so that the sound absorbing material using said pulp fiber will have an excessive airflow resistance, resulting in a deteriorated sound absorbing performance.

Figure 5:
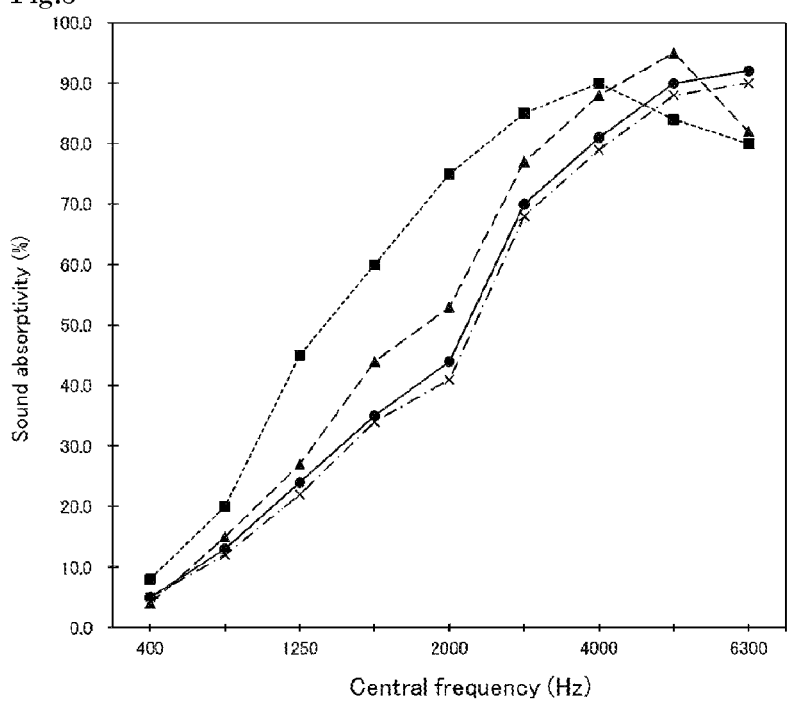
FIG. 5 is a graph showing the sound absorptivities per frequency regarding the sound absorbing materials No. 4, No. 5, No. 6 and No. 9.

The test results of samples in EXAMPLE 2 and COMPARISON 3 are shown in table 2, FIGS. 5 and 6. Referring to the test results in the case of the sound absorbing material sample No. 12 in COMPARISON 3, said sample was made from a pulp fiber material having a refining degree of beyond 650 ml (CSF) and/or below 15° SR, giving said sample a low airflow resistance, so that to adjust its airflow resistance to be in the range provided in the present invention, a large amount of synthetic resin is necessary to be coated onto said sound absorbing material, resulting in, said sound absorbing material sample No. 12 having a large unit weight.

On the other hand, in the case of the sound absorbing material of EXAMPLE 2 which uses a pulp fiber material having a refining degree in the range provided in the present invention, to adjust the airflow resistance provided in the present invention, by coating a synthetic resin onto said sound absorbing material, the necessary amount of the synthetic resin to be coated can be reduced, so that a light weight sound absorbing material with an excellent sound absorbing performance is obtained. In the case where the pulp fiber is refined to give a proper refining degree (350 ml to 650 ml (CSF) and/or 15° SR to 30° SR), it seems that the resulting pulp fiber becomes porous forming with innumerable minute holes opening onto the surface of said pulp fiber, the sound absorbing material made from said pulp fiber having a proper airflow resistance for the sound absorbing performance. In the case of a traditional sound absorbing material using a traditional synthetic resin fiber, since said traditional synthetic resin fiber is produced by the melt spinning method, wherein the melted synthetic resin is spun from the nozzle of the spinning die, so that the resulting synthetic resin fiber has no hole opening onto its surface. Accordingly each fiber produced by the melt spinning method is not porous itself, with the air-permeability of the resulting fiber sheet being controlled only by spaces between the fibers, and to secure a desirable sound absorbing performance by adjusting air-permeability of said fiber sheet using minute fibers, it is considered that the bulk density and the weight of said fiber sheet should be increased.

Considering the aforementioned, said multilayered sound absorbing material of the present invention is a laminated material consisting of said sound absorbing material and porous sheet made of said fiber sheet using said pulp fiber material having refining degree of 350 ml to 650 ml (CSF) and/or 15° SR to 30° SR, and an airflow resistance in the range of between 0.05 and 3.0 kPa·s/m, and it is recognized that said laminated material is a light weight, with an excellent sound absorbing performance. In a case where the fiber sheet uses a pulp fiber material having refining degree of beyond 650 ml (CSF) and/or below 15° SR, it may be difficult to secure the proper airflow resistance of the resulting sound absorbing material, while in a case where a fiber sheet using a pulp fiber material having a refining degree of below 350 ml (CSF) and/or beyond 30° SR, the airflow resistance of the resulting sound absorbing material may become excessive, remarkably deteriorating its sound absorbing performance in a frequency range of higher than 2000 Hz.

EXAMPLE 3

A pulp fiber material containing 70% by mass of a conifer pulp and 30% by mass of a broad-leaved tree pulp was refined using a disc-refiner to make a refined pulp fiber material having a refining degree of 430 ml on the basis of Canadian Standard Freeness (CSF), and 26° SR on the basis of Schopper-Riegler Freeness (SR). Using said refined pulp fiber material a green paper was prepared by the paper-making method, after which the resulting green paper was dried by the Yankee dryer system to prepare two kinds of sound absorbing material samples Nos. 13 and 14, sample No. 13 having a unit weight of 26 g/m² with a creping degree of 20%, and sample No. 14 having a unit weight of 26 g/m², with a creping degree of 40%.

Following this, a porous sheet having a thickness of 15 mm and a unit weight of 300 g/m² was prepared by defibrating and mixing a fiber mixture web containing 70% by mass of a polyester fiber and 30% by mass of a low melting point polyester fiber (melting point: 160° C.), heating the resulting fiber mixture web, adjusting its thickness gradually by the ordinary method, then cooling.

A cobweb like hotmelt adhesives having a unit weight of 10 g/m², and made from a polyamide (melting point: 130° C.) were laminated onto both sides of each sound absorbing material Nos. 13 and 14, each being made of said creped paper as the air-permeable adhesive layer and two kinds of multilayered sound absorbing material samples, each sample having a thickness of 10 mm were prepared by adhering said porous sheets onto the both sides of each sound absorbing material by being sucked in a constant temperature device at 135° C. to adhere said porous sheets onto both sides of each sound absorbing material.

Figure 8:
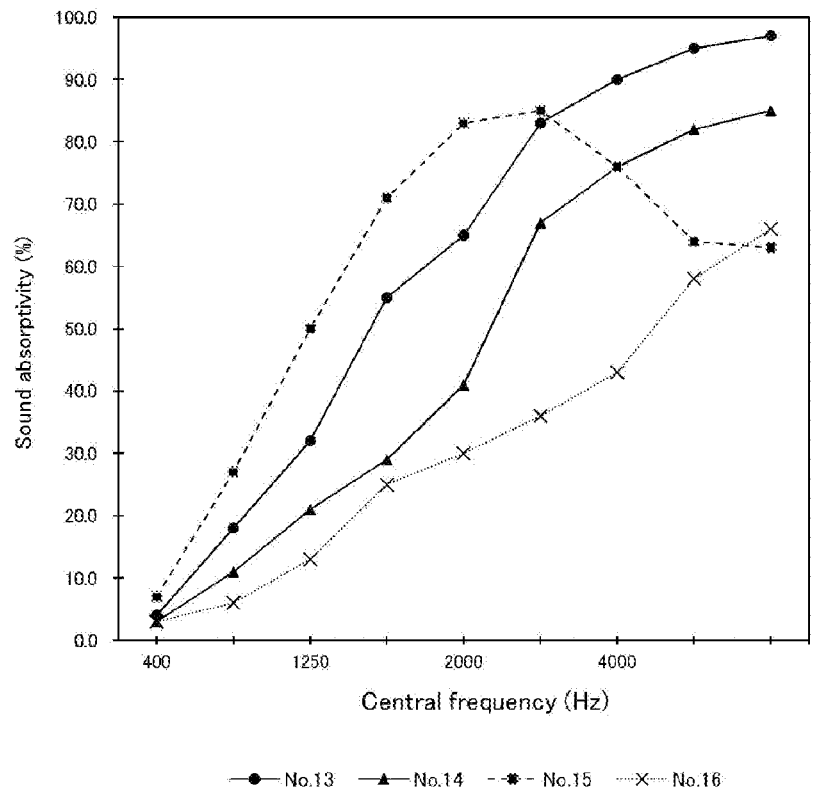
FIG. 8 is a graph showing the sound absorptivities per frequency regarding the multilayered sound absorbing materials No. 13, No. 14, No. 15 and No. 16.

Further, molded multilayered sound absorbing material samples were prepared by heating said samples at 150° C., then cold-molding said heated samples into a prescribed shape. The airflow resistance of said sound absorbing material samples Nos. 13 and 14, and appearances of the resulting multilayered sound absorbing material samples, and molded multilayered sound absorbing material samples are shown in Table 3, and the results of the measurements of the sound absorptivities of said multilayered sound absorbing material samples are shown in Table 6 and FIG. 8.

PREFERRED EXAMPLE 1

Sound absorbing material samples Nos. 15 and 16 were prepared in the same way as applied in EXAMPLE 3, with the exception that two kinds of creped papers, having creping degree of 8% and 55% respectively were used, and multilayered sound absorbing material samples were also prepared using said sound absorbing materials Nos. 15 and 16 in the same way as applied in EXAMPLE 3. Further, molded multilayered sound absorbing material samples were prepared by heating each multilayered sound absorbing material sample, then cold-molding said heated multilayered sound absorbing material sample into a prescribed shape. The airflow resistances of said sound absorbing material samples Nos. 15 and 16, and said multilayered sound absorbing material samples, and the appearances of said molded multilayered sound absorbing material samples are shown in Table 3, with the results of the measurements of the sound absorptivities of said multilayered sound absorbing material samples being shown in Table 6 and FIG. 8.

EXAMPLE 4

A pulp fiber material containing 80% by mass of a conifer pulp and 20% by mass of a broad-leaved tree pulp was refined by using a disc-refiner to make a refined pulp fiber material, having a refining degree of 360 ml on the basis of Canadian Standard Freeness (CSF) and 28° SR on the basis of Schopper Riegler Freeness (SR). Using said refined pulp fiber material, a green paper was prepared by the paper—making method. Using said green paper, two kinds of fiber sheets (embossed paper samples) namely the sound absorbing material samples Nos. 17 and 18 (embossed papers) were prepared by the ordinary embossing system, samples Nos. 17 and 18 each having a unit weight of 18 g/m$^2$, and 64 projections/m$^2$, respectively, with the height of each projection of said sample No. 17 being 0.1 mm, and the height of each projection of sample No. 18 being 0.15 mm.

Figure 9:
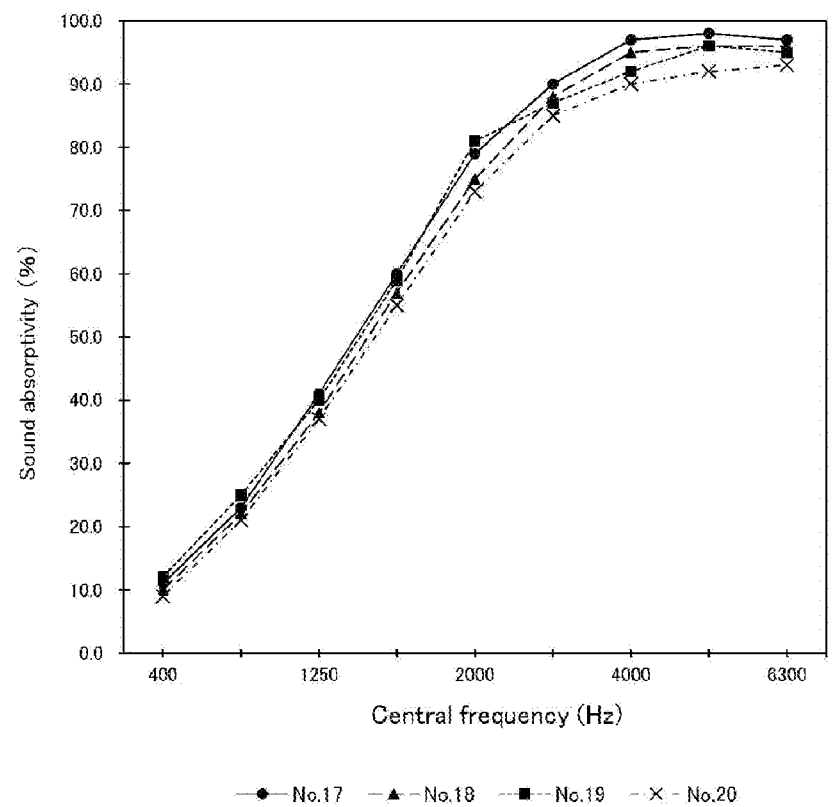
FIG. 9 is a graph showing the sound absorptivities per frequency regarding the multilayered sound absorbing materials No. 17, No. 18, No. 19 and No. 20.

Following this, a porous sheet having a thickness of 20 mm and a unit weight of 500 g/m$^2$ was prepared by defibrating and mixing a fiber mixture web containing 70% by mass of a polyester fiber and 30% by mass of a low melting point polyester fiber (melting point: 160° C.), then heating the resulting fiber mixture web, adjusting the thickness of said fiber mixture web gradually by the ordinary method, then cooling. A cobweb-like hotmelt adhesive having a unit weight of 10 g/m$^2$, and made from a polyamide (melting point: 130° C.) as an air-permeable adhesive layer, was put onto both sides of said porous sheet and further, said sound absorbing material samples Nos. 17 and 18, each having been made of said embossed paper samples were laminated onto both sides of said porous sheet through said air-permeable adhesive layers, after which the resulting laminated materials were then heated in a constant temperature device at 135° C. with sucking to adhere each of said sound absorbing material samples Nos. 17 and 18 to said porous sheets, to prepare two kinds of multilayered sound absorbing material samples, each sample having a thickness 15 mm. The airflow resistances of said sound absorbing material samples Nos. 17 and 18, and of said multilayered sound absorbing material samples using said sound absorbing material samples Nos. 17 and 18, and appearance of molded multilayered sound absorbing material samples prepared by heating each multilayered sound absorbing material sample at 150° C. and cold-molding each heated sample into a prescribed shape, are shown in Table 4, and the results of the measurements of the sound absorptivities of said multilayered sound absorbing material samples are shown in Table 6 and FIG. 9.

PREFERRED EXAMPLE 2

Sound absorbing material samples Nos. 19 and 20 were prepared by the same way as applied in EXAMPLE 4, with the exception that two kinds of embossed papers, the height of each projection on one of said embossed paper samples being 0.01 mm (sample No. 19) and the height of each projection on the other embossed paper sample being 2.3 mm (sample No. 20), were used in this EXAMPLE, and multilayered sound absorbing material samples were prepared using said sound absorbing materials Nos. 19 and 20 also in the same way as applied in Example 4. The resulting multilayered sound absorbing material samples were heated at 150° C., and then cold-molded into a prescribed shape to prepare molded multilayered sound absorbing material samples. The airflow resistances of said sound absorbing material samples Nos. 19 and 20, and said multilayered sound absorbing material samples using said sound absorbing material samples Nos. 19 and 20, and the appearances of said molded multilayered sound absorbing material samples, are shown in Table 4, with the results of the measurements of the sound absorptivities of said multilayered sound absorbing material samples being shown in Table 6 and FIG. 9.

EXAMPLE 5

A pulp fiber material containing 70% by mass of a conifer pulp and 30% by mass of a broad leaved tree pulp was refined using a disc-refiner to make a refined pulp fiber material having a refining degree of 360 ml on the basis of Canadian Standard Freeness (CSF), and 28° SR on the basis of Schopper-Riegler Freeness (SR). Using said refined pulp fiber material, a green paper was prepared by the paper making method. Using said green paper, two kinds of sound absorbing material samples Nos. 21 and 22, which were each embossed fiber sheets (embossed paper), were prepared by the ordinary embossing of said green paper, wherein samples Nos. 21 and 22 had a unit weight of 18 g/m$^2$, with the height of each projection of each sample being 0.05 mm, the number of projections of sample No. 21 being 36 prejections/cm$^2$, with the number of projections of sample No. 22 being 144 prejections/cm$^2$. Following this, a porous sheet having a thickness of 20 mm and a unit weight of 500 g/m$^2$ was prepared by defibrating and mixing a fiber mixture web containing 70% by mass of a polyester fiber, and fiber and 30% by mass of a low melting point polyester fiber (melting point: 160° C.), heating the resulting fiber mixture web, then gradually adjusting the thickness of said fiber mixture web by the ordinary method, and then cooling. A cobweb-like hotmelt adhesive, having a unit weight 10 g/m$^2$, and made from a polyamide (melting point: 130° C.) as an air-permeable adhesive layer, was put onto one side of said porous sheet, and further, said sound absorbing material samples Nos. 21 and 22 each being made of said embossed paper samples were each laminated onto said porous sheet through said air-permeable adhesive layers after which the resulting laminated materials were then heated in a constant temperature device at 135° C. with sucking to adhere each of said sound absorbing material samples Nos. 21 and 22 to said porous sheets, preparing two kinds of multilayered sound absorbing material samples, each sample having a thickness of 15 mm.

Figure 10:
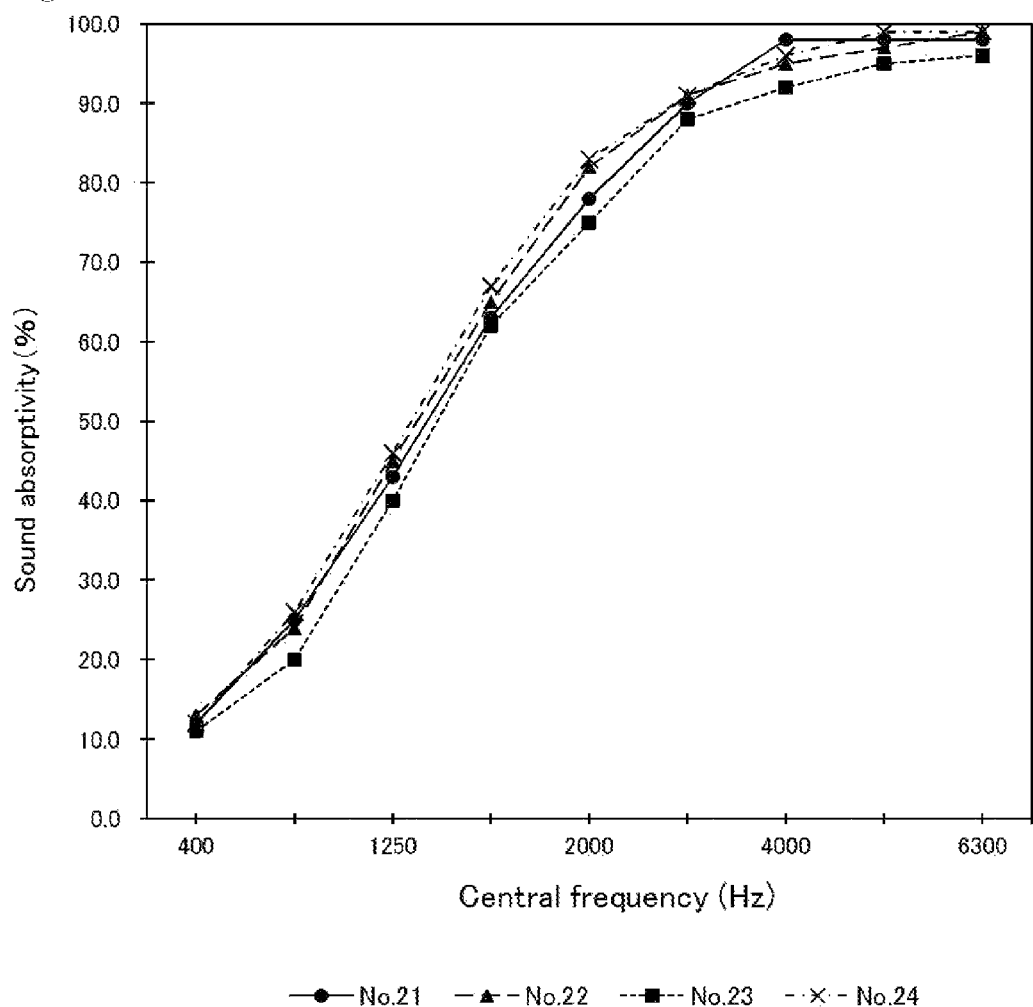
FIG. 10 is a graph showing the sound absorptivities per frequency regarding the multilayered sound absorbing materials No. 21, No. 22, No. 23 and No. 24.

The airflow resistances of each sample, said sound absorbing samples Nos. 21 and 22, and said multilayered sound absorbing material sample, using said sound absorbing material samples Nos. 21 and 22, and the appearance of said molded multilayered sound absorbing material samples having been prepared by heating each multilayered sound absorbing material sample at 150° C., and then cold-molding each heated sample into a prescribed shape are shown in Table 5, with the results of the measurements of the sound absorptivities of said multilayered sound absorbing material samples being shown in Table 6 and FIG. 10.

PREFERRED EXAMPLE 3

The sound absorbing material samples Nos. 23 and 24 were prepared in the same way as applied in EXAMPLE 5, with the exception that two kinds of embossed papers, with the numbers of projections being 16 projections/cm$^2$ (sample No. 23) and 225 projections/cm$^2$ (sample No. 24) were used in this EXAMPLE, with the multilayered sound absorbing material samples being prepared using said sound absorbing materials Nos. 23 and 24, in the same way as applied in Example 5. The resulting multilayered sound absorbing material samples were then heated at 150° C., and then cold-molded into a prescribed shape to prepare molded multilayered sound absorbing material samples.

The airflow resistances of said sound absorbing material samples Nos. 23 and 24, and said multilayered sound absorbing material samples using said sound absorbing material samples Nos. 23 and 24, and the appearance of said molded multilayered sound absorbing material samples are shown in Table 5, and the results of the measurements of the sound absorptivities of said multilayered sound absorbing material samples are shown in Table 6 and FIG. 10.

TABLE 3

|  | Sound absorbing material No. | Creping degree (%) | Air-flow resistance (kPa · s/m) | | Appearance of molded sample* |
|---|---|---|---|---|---|
|  |  |  | Sound absorbing material | Multilayered sound absorbing material |  |
| EXAMPLE 3 | 13 | 20 | 0.834 | 0.908 | ⊚ |
|  | 14 | 40 | 0.158 | 0.236 | ⊚ |
| REFERRED EXAMPLE 1 | 15 | 8 | 2.881 | 2.953 | X |
|  | 16 | 55 | 0.063 | 0.137 | Δ |

TABLE 4

|  | Sound absorbing material No. | Height of projection (mm) | Air-flow resistance (kPa · s/m) | | Appearance of molded sample* |
|---|---|---|---|---|---|
|  |  |  | Sound absorbing material | Multilayered sound absorbing material |  |
| EXAMPLE 4 | 17 | 0.10 | 0.382 | 0.800 | ⊚ |
|  | 18 | 0.15 | 0.375 | 0.789 | ⊚ |
| REFERRED EXAMPLE 2 | 19 | 0.01 | 0.381 | 0.806 | X |
|  | 20 | 2.30 | 0.374 | 0.788 | Δ |

TABLE 5

|  | Sound absorbing material No. | Height of Projection (No./cm$^2$) | Air-flow resistance (kPa · s/m) | | Appearance of molded sample* |
|---|---|---|---|---|---|
|  |  |  | Sound absorbing material | Multilayered sound absorbing material |  |
| EXAMPLE 5 | 21 | 36 | 0.427 | 0.467 | ⊚ |
|  | 22 | 144 | 0.430 | 0.470 | ⊚ |
| REFERRED EXAMPLE 3 | 23 | 16 | 0.415 | 0.454 | X |
|  | 24 | 225 | 0.431 | 0.473 | Δ |

* The appearance of the molded multilayered sound absorbing material samples.

The appearance of each molded multilayered sound absorbing material sample was observed.

⊚: The molded sample has a preferable appearance as a whole, with no abnormalities in its deep drawing part(s), and a fine surface.

Δ: The sample can be molded into a prescribed shape, but wrinkles form in its deep drawing part(s), giving it a deteriorated appearance.

X: Wrinkles are formed wholly throughout said molded sample and with cracks appearing, particularly in its deep drawing part(s).

TABLE 6

Sound absorptivity by frequency using the vertical incidence method (%)

|  | No. | Frequency (Hz) | | | | | | | |
|---|---|---|---|---|---|---|---|---|---|
|  |  | 400 | 800 | 1250 | 1600 | 2000 | 3150 | 4000 | 5000 | 6300 |
| EXAMPLE 3 | 13 | 4 | 18 | 32 | 55 | 65 | 83 | 90 | 95 | 97 |
|  | 14 | 3 | 11 | 21 | 29 | 41 | 67 | 76 | 82 | 85 |
| PREFERRED EXAMPLE 1 | 15 | 7 | 27 | 50 | 71 | 83 | 85 | 76 | 64 | 63 |
|  | 16 | 3 | 6 | 13 | 25 | 30 | 36 | 43 | 58 | 66 |
| EXAMPLE 4 | 17 | 11 | 23 | 41 | 60 | 79 | 90 | 97 | 98 | 97 |
|  | 18 | 10 | 22 | 38 | 57 | 75 | 88 | 95 | 96 | 96 |

TABLE 6-continued

Sound absorptivity by frequency using the vertical incidence method (%)

|  | No. | Frequency (Hz) | | | | | | | |
|---|---|---|---|---|---|---|---|---|---|
|  |  | 400 | 800 | 1250 | 1600 | 2000 | 3150 | 4000 | 5000 | 6300 |
| PREFERRED EXAMPLE 2 | 19 | 12 | 25 | 40 | 59 | 81 | 87 | 92 | 96 | 95 |
|  | 20 | 9 | 21 | 37 | 55 | 73 | 85 | 90 | 92 | 93 |
| EXAMPLE 5 | 21 | 12 | 25 | 43 | 63 | 78 | 90 | 98 | 98 | 98 |
|  | 22 | 13 | 24 | 45 | 65 | 82 | 91 | 95 | 97 | 99 |

TABLE 6-continued

Sound absorptivity by frequency
using the vertical incidence method (%)

| | No. | 400 | 800 | 1250 | 1600 | 2000 | 3150 | 4000 | 5000 | 6300 |
|---|---|---|---|---|---|---|---|---|---|---|
| PREFERRED EXAMPLE 3 | 23 | 11 | 20 | 40 | 62 | 75 | 88 | 92 | 95 | 96 |
| | 24 | 12 | 26 | 46 | 67 | 83 | 91 | 96 | 99 | 99 |

Sound absorptivity: the sound absorptivity for vertical incident sound waves was measured following the pipe method provided in JIS A 1405. Regarding samples of EXAMPLE 5 and PREFERRED EXAMPLE 3, the sound absorptivity was measured by arranging said samples so as to turn the sound absorbing material side of each of said multilayered sound absorbing material samples toward the microphone.

Considering the test results of the samples of EXAMPLE 3, and PREFERRED EXAMPLE 1, as shown in Table 3, in a case where the creping degree of said sound absorbing material is below 10%, or beyond 50%, wrinkles or cracks will appear in the deep drawing part(s) of said molded sample, and a proper airflow resistance will be difficult to secure.

Considering the test results of the samples of EXAMPLE 4, and PREFERRED EXAMPLE 2, as shown in Table 4, in a case where the height of each projection of said embossed sound absorbing material is below 0.02 mm or beyond 2.00 mm, wrinkles or cracks will appear in the deep drawing part(s) of said molded sample.

Considering the test results of samples of EXAMPLE 5 and PREFERRED EXAMPLE 3, as shown in Table 5, in a case where the number of projections of said embossed sound absorbing material is below 20 projections/cm$^2$, or beyond 200 projections/cm$^2$, wrinkles or cracks will appear in the deep drawing part(s) of said molded sample.

Further, in a case where said porous sheets are laminated onto the both sides of said sound absorbing material of the present invention or said sound absorbing materials are laminated onto both sides of said porous sheet, for instance, in the case of said multilayered sound absorbing materials of EXAMPLE 3, and EXAMPLE 4, said multilayered sound absorbing material may be arranged so as to make either said porous sheet side or said sound absorbing material side face the sound source. Further, in the case of a multilayered sound absorbing material, wherein said sound absorbing material is laminated onto one side of said porous sheet, for instance, in the case of said multilayered sound absorbing materials of EXAMPLE 5, said multilayered sound absorbing material may be arranged, so as to face said sound source.

EXAMPLE 6

A pulp/hemp fiber mixture material containing 95% by mass of a conifer pulp and 5% by mass of a hemp fiber was refined using a disc-refiner to make a refined pulp fiber material having a refining degree 580 ml on the basis of Canadian Standard Freeness (CSF) and 22° SR on the basis of Schopper Riegler Freeness (SR). Using said refined pulp/hemp fiber mixture material, a green paper was prepared by the paper making method. Using said green paper, a sound absorbing material, which was a fiber sheet (creped paper), was prepared by drying said green paper using an ordinary Yankee drier system. The resulting sound absorbing material (creped paper) had a unit weight of 23 g/m$^2$, creping degree of 20%, and an airflow resistance of 0.803 kPa·s/m.

Following this, then a porous sheet which is a nonwoven fabric made of a polyester fiber, and having a unit weight of 80 g/m$^2$, was prepared by the needle punching method, and a polyamide copolymer powder (melting point: 135° C., particle size: 200 μm to 300 μm) was scattered onto one side of said porous sheet in an amount of 5 g/m$^2$, to form an air-permeable hotmelt adhesive layer. Said sound absorbing material was then put onto said porous sheet through said air-permeable hotmelt adhesive layer and the resulting laminated material was then hot-pressed from said sound absorbing material side with a hot press roll at 160° C. to melt said polyamide copolymer powder to adhere said sound absorbing material which was said fiber sheet (creped paper), to said porous sheet, preparing a multilayered sound absorbing material having an airflow resistance of 0.835 kPa·s/m.

A mixture solution containing 40 parts by mass of a sulfomethylated phenol-alkylresorcin-formaldehyde cocondensation polymer water solution (40% by mass), 2 parts by mass of a carbonblack water dispersion (50% by mass) and 58 parts by mass of water was prepared and then said mixture solution was sprayed onto said sound absorbing material side of said multilayered sound absorbing material in an amount to be 30 g/m$^2$ as said mixture solution, after which said multilayered sound absorbing material, onto which said mixture solution was sprayed, was heated at 120° C. for 3 minutes to dry and put said cocondensation polymer at its B-stage and preparing a multilayered sound absorbing material as a surface material.

Further, a resol type phenol resin was coated onto a glass wool green web sheet having a unit weight of 400 g/m$^2$, in a coating amount of 20% by mass for said glass wool green web sheet, to prepare a porous base sheet, and then said multilayered sound absorbing material as the surface material was put onto said porous base sheet, so as to attach said sound absorbing material of said multilayered sound absorbing material to said porous base sheet, after which the resulting laminated material was molded with a hotpress machine at 200° C. into a prescribed shape, to manufacture a sound absorbing interior finishing material.

The resulting sound absorbing interior finishing material has good weatherability, light weight, and further, an excellent sound absorbing performance.

In the case of a traditional interior finishing material manufactured by laminating a needle punched nonwoven fabric onto said porous base sheet as a surface material and then molding the resulting laminated material into a prescribed shape, said traditional interior finishing material has a problem in that the yellow color of said glass wool is visible through thin part(s) of said needle punched nonwoven fabric as the surface material, since the unit weight of said nonwoven fabric is inherently uneven. However, in the case of said sound absorbing interior finishing material manufactured in this EXAMPLE, since carbon black was added to said mixture solution containing said cocondensation polymer water solution, which was sprayed onto said sound absorbing material made of said creped paper, the surface of said sound absorbing material was uniformly black colored, so that the color of said porous base sheet was concealed by said black colored sound absorbing material when said sound absorbing interior finishing material was observed from the outside, resulting in said sound absorbing interior finishing material having a wholly uniform black colored appearance. Traditionally, as a means of improving the uneven appearance of said interior finishing material, increasing the unit weight of said nonwoven fabric, or laminating a film or a nonwoven fabric having the same color as the color of the base material has been provided (Tokkai 2006-35949, Tokkai Hei 11-227511), while said sound absorbing material of the present invention has a wholly black color, so that it is easy to provide a surface material matching the color of the base material, thus improving the appearance of said interior finishing material, without any deterioration of the sound absorbing performance of said interior finishing material.

EXAMPLE 7

A pulp fiber material consisting of 100% by mass of a conifier pulp was refined using a disc-refiner to make a refined pulp fiber material having a refining degree of 460 ml on the basis of Canadian Standard Freeness (CSF) and 25° SR as Schopper-Riegler Freeness. Using said refined pulp fiber material, a green paper was prepared by the paper making method. Using said green paper, a sound absorbing material which was a fiber sheet (creped paper), was prepared by drying said green paper, using a Yankee drier system. The resulting sound absorbing material (creped paper) had a unit weight of 21 g/m$^2$, creping degree of 18%, and the airflow resistance of 0.637 kPa·s/m.

Following this, a nonwoven fabric, which was a nonwoven fabric made of a polyester fiber by the spun-bond method, was prepared, as a porous sheet, said porous sheet having a unit weight of 30 g/m$^2$. A polyamide copolymer powder (melting point: 135° C., particle size: 200 μm to 300 μm) was scattered onto one side of said porous sheet in a coating amount of 10 g/m$^2$, to form an air-permeable hotmelt adhesive layer.

Said sound absorbing material was then put onto said porous sheet through said air-permeable hotmelt adhesive layer, and the resulting laminated material was hot-pressed from said sound absorbing material side using a hot press roll at 160° C., to melt said polyamide copolymer powder, and adhere said sound absorbing material to said porous sheet, and prepare a multilayered sound absorbing material.

A mixture solution containing 30 parts by mass of a sulfomethylated phenol-alkyl resorcin-formaldehyde cocondensation polymer water solution (40% by mass), 2 parts by mass of a carbon black water dispersion (50% by mass), 3 parts by mass of a fluorine group water and oil repellant agent water solution (10% by mass) and 65 parts by mass of water was prepared, then said mixture solution was coated and impregnated on/into said multilayered sound absorbing material by roll coating in an amount to be 30 g/m$^2$ as a solid, after which said multilayered sound absorbing material, onto which said mixture solution was coated, was then dried at 120° C. for 3 minutes to put said cocondensation polymer at its B-stage, to manufacture a multilayered sound absorbing material as a surface material.

Further, a resol type phenol resin was coated onto a glass wool green web sheet having a unit weight of 500 g/m$^2$ in a coating amount of 20% by mass for said glass wool green web sheet, to prepare a porous base sheet, and said multilayered sound absorbing material as the surface material, was put onto said porous base sheet, so as to attach said sound absorbing material of said multilayered sound absorbing material to said porous base sheet, the resulting laminated material being molded with a hot press machine at 200° C. into a prescribed shape, to manufacture a sound absorbing interior finishing material.

The resulting sound absorbing interior finishing material has a good weatherability, excellent water and oil proof properties, and further, light weight, and an excellent sound absorbing performance.

Figure 11:
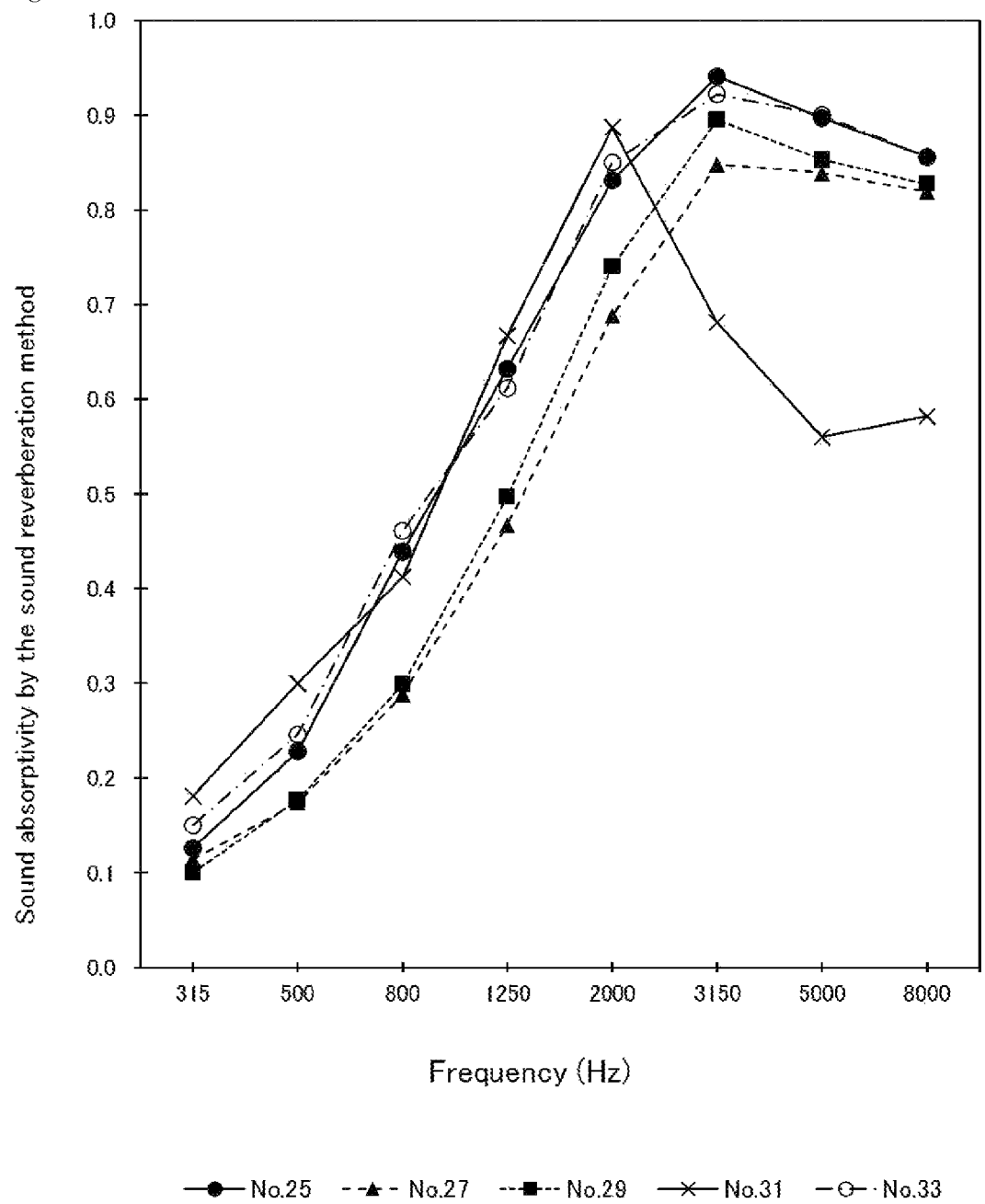
FIG. 11 is a graph showing the sound absorptivities per frequency regarding samples No. 25, No. 27, No. 29, No. 31 and No. 33.
Figure 12:
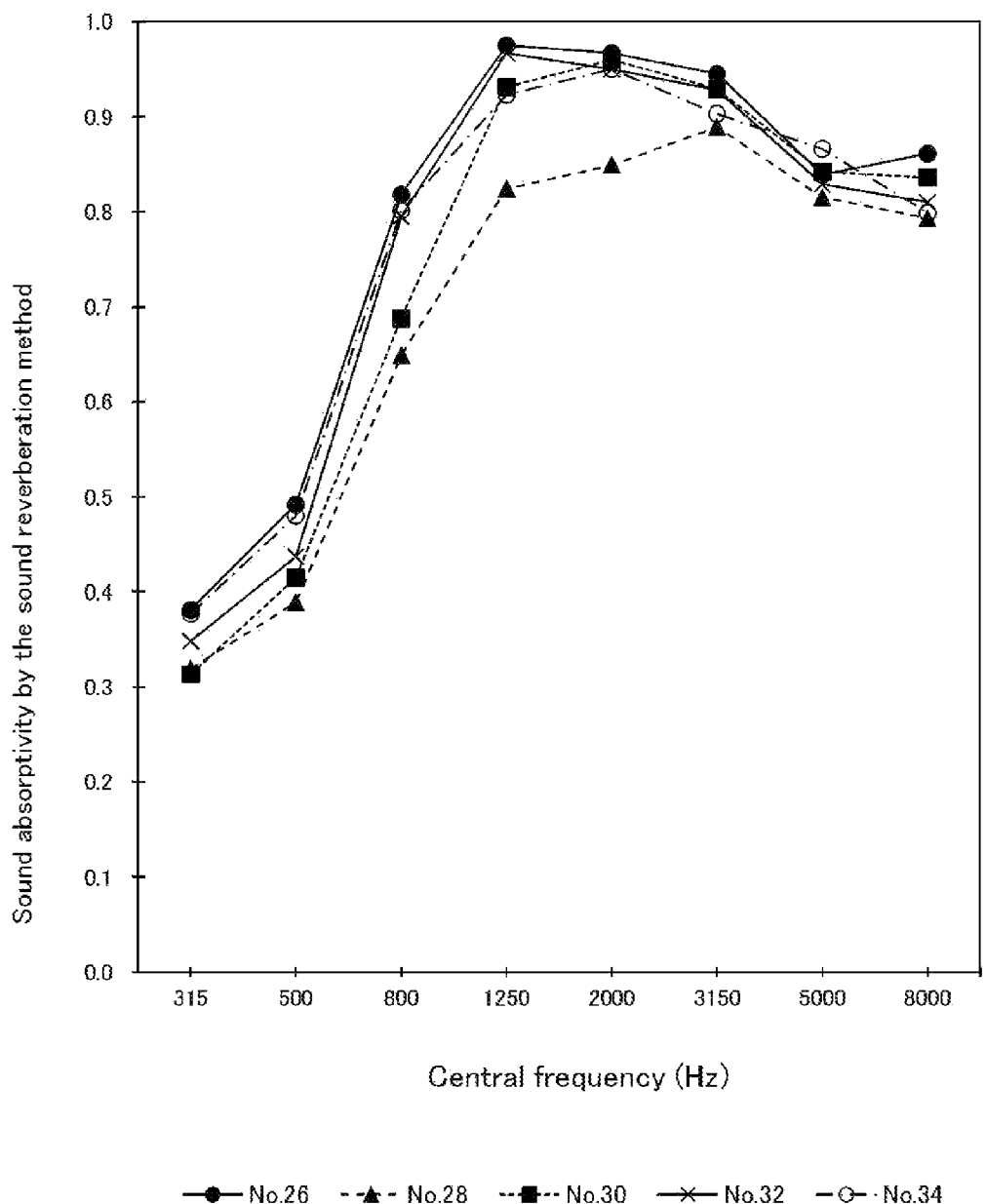
FIG. 12 is a graph showing the sound absorptivities per frequency regarding samples No. 26, No. 28, No. 30, No. 32 and No. 34.

Test samples Nos. 25 and 26 were prepared by cutting said sound absorbing interior finishing material into pieces, each piece having a thickness of either 10 mm (No. 25) or 20 mm (No. 26), and then using said test samples, the airflow resistance, appearance and sound absorptivities by the reverberation method of each sample were measured, and the results are shown in Tables 7, 8, and FIGS. 11, 12.

[Comparison 4]

Said sound absorbing material and said air-permeable hotmelt adhesive layer made of polyamide copolymer powder were omitted from said sound absorbing interior finishing material of EXAMPLE 7, and molded samples Nos. 27, 28, 29, 30, 31 and 32 were prepared in the same way as applied in EXAMPLE 7, with the exception that glass wool green webs having unit weights set to be 500 g/m$^2$, 1000 g/m$^2$ and 1500 g/m$^2$ respectively were used, with the thickness of these samples being set to be 10 mm and 20 mm. The airflow resistance, appearance, and sound absorptivities by the reverberation method of each molded sample were measured, and the results are shown in Tables 7, 8 and FIGS. 11, 12.

[Comparison 5]

Said sound absorbing material and said air-permeable hotmelt adhesive layer made from a polyamide copolymer were omitted from said sound absorbing interior finishing material of EXAMPLE 7, and the molded samples Nos. 33 and 34 were prepared in the same way as applied EXAMPLE 7, with the exception that a nonwoven fabric made from a polyester fiber by the spun-bond method, having a unit weight of 160 g/m$^2$ (airflow resistance 0.682 kPa·s/m) was used as a porous sheet for the surface material side, and said mixture solution containing said concondensation polymer water solution used in EXAMPLE 7 was coated on and impregnated into each sample, after which each sample was then molded in the same way as applied in EXAMPLE 7, to molded samples Nos. 33 and 34. The thickness of sample No. 33 was set to be 10 mm, while the thickness of sample No. 34 was set to be 20 mm. The airflow resistance, appearance and sound absorptivities by the reverberation method of each molded sample were measured, and the results are shown in Tables 7 and 8, and FIGS. 11 and 12.

TABLE 7

| | No. | Unit weight of porous base sheet (g/m$^2$) | Thickness of molded sample (mm) | Air-flow resistance (kPa · s/m) | | Apearance of molded sample* |
|---|---|---|---|---|---|---|
| | | | | Sound absorbing material | molded sample | |
| EXAMPLE 7 | 25 | 500 | 10 | 0.637 | 1.189 | ◎ |
| | 26 | 500 | 20 | 0.637 | 0.984 | ◎ |
| COMPARISON 4 | 27 | 500 | 10 | — | 0.562 | ◎ |
| | 28 | 500 | 20 | — | 0.349 | ◎ |
| | 29 | 1000 | 10 | — | 0.766 | ◎ |
| | 30 | 1000 | 20 | — | 0.527 | ◎ |

TABLE 7-continued

|  | No. | Unit weight of porous base sheet (g/m²) | Thickness of molded sample (mm) | Air-flow resistance (kPa·s/m) Sound absorbing material | Air-flow resistance (kPa·s/m) molded sample | Apearance of molded sample* |
|---|---|---|---|---|---|---|
|  | 31 | 1500 | 10 | — | 1.398 | ◉ |
|  | 32 | 1500 | 20 | — | 0.954 | ◉ |
| COMPARISON 5 | 33 | 500 | 10 | — | 1.190 | X X |
|  | 34 | 500 | 20 | — | 0.989 | X X |

*Appearance of molded sample
The appearance of each molded sample having a prescribed shape was observed.
◉: Molded sample has no defect in appearance as a whole, and has a clean surface.
X X: Large wrinkles were produced throughout the entire molded sample, giving said molded sample a remarkably inferior appearance, and no value as a product.

TABLE 8

Sound absorptivity by frequency using the reverberation method

|  | No. | Unit weight of porous base sheet (g/m²) | Thickness of molded sample (mm) | Frequency (Hz) | | | | | | | |
|---|---|---|---|---|---|---|---|---|---|---|---|
|  |  |  |  | 315 | 500 | 800 | 1250 | 2000 | 3150 | 5000 | 8000 |
| EXAMPLE 7 | 25 | 500 | 10 | 0.126 | 0.228 | 0.439 | 0.632 | 0.831 | 0.941 | 0.897 | 0.856 |
|  | 26 | 500 | 20 | 0.381 | 0.492 | 0.818 | 0.975 | 0.967 | 0.945 | 0.839 | 0.861 |
| COMPARISON 4 | 27 | 500 | 10 | 0.114 | 0.174 | 0.288 | 0.467 | 0.688 | 0.848 | 0.839 | 0.819 |
|  | 28 | 500 | 20 | 0.319 | 0.389 | 0.649 | 0.824 | 0.849 | 0.889 | 0.815 | 0.793 |
|  | 29 | 1000 | 10 | 0.100 | 0.177 | 0.299 | 0.497 | 0.740 | 0.895 | 0.853 | 0.827 |
|  | 30 | 1000 | 20 | 0.313 | 0.415 | 0.688 | 0.931 | 0.960 | 0.929 | 0.842 | 0.836 |
|  | 31 | 1500 | 10 | 0.181 | 0.300 | 0.412 | 0.667 | 0.887 | 0.681 | 0.560 | 0.582 |
|  | 32 | 1500 | 20 | 0.348 | 0.437 | 0.795 | 0.967 | 0.950 | 0.928 | 0.829 | 0.810 |
| COMPARISON 5 | 33 | 500 | 10 | 0.150 | 0.246 | 0.461 | 0.612 | 0.850 | 0.922 | 0.900 | 0.856 |
|  | 34 | 500 | 20 | 0.377 | 0.480 | 0.801 | 0.923 | 0.950 | 0.903 | 0.866 | 0.799 |

Sound absorptivity by the sound reverberation method measured following JISA 1409 sound absorptivity using the reverberation method Referring to Table 7, comparing the unit weight of the porous base sheet of sample No. 25 of EXAMPLE 7, with the unit weights of the porous sheets of samples Nos. 27, 29 and 31 of COMPARISON 4, it is recognized that the airflow resistance of sample No. 25 wherein said sound absorbing material of the present invention was laminated onto said porous base sheet made from a glass wool green web sheet and having a unit weight of 500 g/m², is the same as the airflow resistance of samples Nos. 27, 29 and 31, wherein said sound absorbing material was laminated onto a glass wool green web sheet No. 31 having a unit weight of 1500 g/m².

Further, referring to Table 8 and FIG. 11, it is recognized that said sound absorbing material No. 25 of the present invention is a sound absorbing interior finishing material, having a light weight and an excellent sound absorbing performance.

Considering the results in Table 8, each sample in COMPARISONS, wherein the unit weight of the nonwoven fabric as said porous sheet was increased to adjust its airflow resistance, has a good sound absorbing performance, but each molded sample displays remarkably inferior appearance, making said molded samples inappropriate for products.

Referring to the aforementioned EXAMPLES, using a sound absorbing material consisting of a fiber sheet made of a pulp fiber having refining degree in the range of between 350 and 650 ml on the basis of Canadian Standard Freeness (CFS) provided in JIS P8121-1995-4 Canadian Standard Freeness and/or in the range of between 15 and 130° SR on the basis of Schopper-Riegler Freeness provided in JIS P 8121-1995-5 Shopper Riegler Type Freeness Test Method, and having an airflow resistance in the range of between 0.05 and 3.0 kPa·s/m, a sound absorbing interior finishing material having ½ to ⅓ of the weight of a traditional interior finishing material can be provided.

EXAMPLE 8

A pulp fiber material consisting of 90% by mass of a conifer pulp and 10% by mass of a polyester fiber was refined using a disc-refiner, to make a refined pulp fiber material having a refining degree of 350 ml on the basis of Canadian Standard Freeness (CFS) and 30° SR on the basis of Shopper-Riegler Freeness. Using said refined pulp fiber material, a green paper was prepared by the paper making method. The resulting green paper was then dried using an ordinary Yankee-drier system to manufacture a sound absorbing material, which was a fiber sheet (creped paper), with a unit weight of 16 g/m², a creping degree of 35% and an airflow resistance of 0.677 kPa·s/m.

Next, a nonwoven fabric as a porous sheet was prepared by the needle punching method, using a polyester fiber having a unit weight of 180 g/m2. A polyamide copolymer powder (particle size: 200 μm, melting point: 110° C.) as a hotmelt adhesive was scattered onto the back side of said porous sheet in a coating amount of 15 g/m². Said sound absorbing material was then put onto the back side of said porous sheet onto which said hotmelt adhesive was scattered, and the resulting laminated material was then hot-pressed from said sound absorbing material side with a hot-press roll having surface temperature set to be 180° C. to adhere said sound absorbing material to said porous sheet, and manufacture a surface material, which was a multilayered sound absorbing material, the airflow resistance of said surface material being 0.797 kPa·s/m. Next, a porous base sheet was manufactured by preparing a fiber mixture web consisting of 60 parts by mass of a carbon fiber and 40 parts by mass of a polyamide copolymer fiber (melting point: 140° C.), said fiber mixture web having a unit weight of 300 g/m² and a thickness of about 30 mm. Said porous base sheet, which was said fiber mixture web, was heated at 160° C., to melt said polyamide copolymer fibers, after which said surface material, which was said multilayered sound absorbing material, was put on said fiber mixture web, which was a porous base sheet, after which the resulting laminated material was molded into a prescribed shape, by cold press molding, to manufacture a sound absorbing interior finishing material. The airflow resistance of the resulting interior finishing material, though varying by area, in the range of between about 0.801 and about 1.02 kPa·s/m, said interior finishing material being light weight, and having an excellent sound absorbing performance. Said sound absorbing interior finishing material is useful as an automotive interior finishing material for such as head lining, room partition silencer, dash silencer, package tray, or the like.

EXAMPLE 9

A pulp fiber material consisting of 85% by mass of a conifer pulp and 15% by mass of a broad leaved tree pulp was refined using a disc-refiner to make a refined pulp fiber material having a refining degree of 600 ml on the basis of Canadian Standard Freeness (CSF) and 16° SR on the basis of Schopper-Riegler Freeness. Using said refined pulp fiber material, a green paper was prepared by the paper making method. The resulting green paper was then dried using an ordinary Yankee-drier system, to manufacture a sound absorbing material 11 which was a fiber sheet (creped paper), having a unit weight of 20 g/m², creping degree of 25%, and an air-flow resistance of 1.05 kPa·s/m (cf. FIG. 13)

Figure 13:
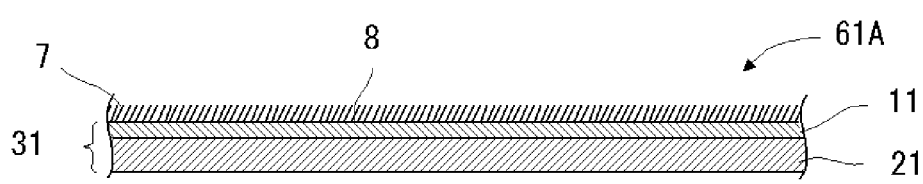
FIG. 13 is a cross sectional view of the sound absorbing floor covering materials 61A, 61B, 61C, 61D in EXAMPLE 9.
Figure 13:
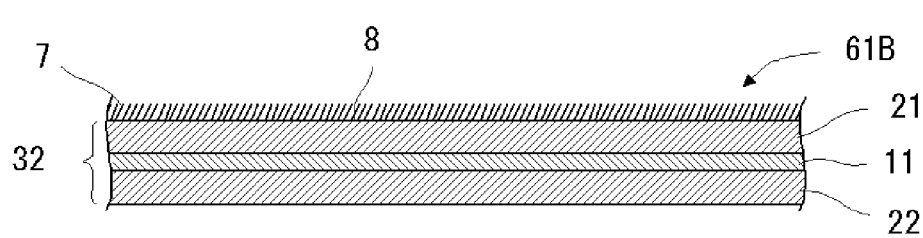
Figure 13:
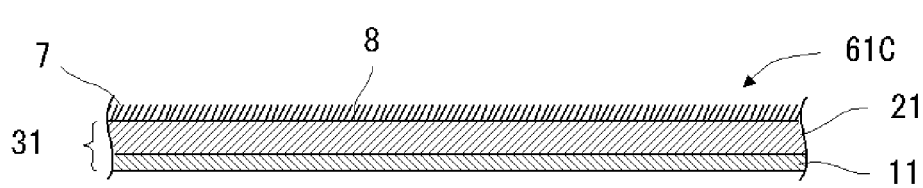
Figure 13:
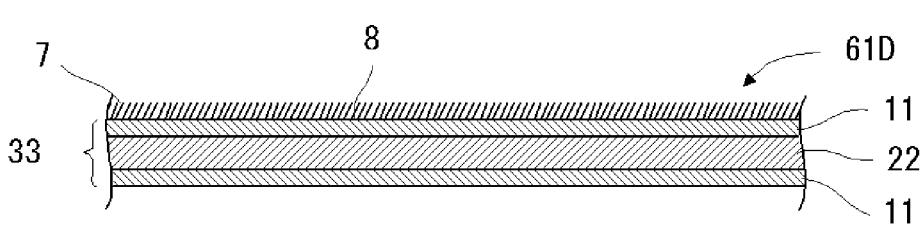

A fiber mixture web consisting of 65% by mass of a polyester fiber and 35% by mass of a polyester core-sheath type composite fiber (melting point of sheath component: 140° C.) and having a unit weight of 160 g/m² was heated at 180° C. for one minute and then molded by cold pressing to obtain two kinds of samples, one being an air-permeable porous sheet sample 21 having a thickness of 3.0 mm, and the other an air-permeable porous sheet sample 22, which was an air-permeable fiber sheet, having a thickness of 4.0 mm (cf. FIG. 13).

A cobweb-like hotmelt adhesive made from a polyamide copolymer (melting point: 120° C.) was put onto one side of said porous sheet 21, and further said sound absorbing material 11 was put onto said porous sheet 21 through said cobweb-like hotmelt adhesive, after which the resulting laminated material was then lightly hot-pressed at 130° C. for 5 seconds with a hot-press machine to manufacture a multilayered sound absorbing material 31 as shown in FIG. 13 (a). Further, in the same way, said sound absorbing material 11 was inserted between said air-permeable porous sheets 21 and 22, and then the resulting laminated material was hot-pressed to manufacture the multilayered sound absorbing material 32 as shown in FIG. 13 (b), and a pair of said sound absorbing materials 11, 11 were then put onto the both sides of said air-permeable porous sheet 22, after which the resulting laminated material was then hot-pressed, to manufacture the multilayered sound absorbing material 33 as shown in FIG. 13 (d).

Each of said multilayered sound absorbing materials 31, 32, or 33 was adhered to the back side of a carpet 7, on which a polyethylene backing layer 8 was formed to manufacture car floor covering materials (sound absorbing floor covering materials) 61 A, B, C, D as shown in FIGS. 13 (a, b, c, d).

Said sound absorbing floor covering materials 61A and 61C each used the same multilayered sound absorbing material 31, but said floor covering material 61A shown in FIG. 13 (a), had a structure wherein said carpet 7 was arranged on said sound absorbing material 11 side, on the contrary said floor covering material 61C had a structure wherein said carpet 7 was arranged on the side of said air-permeable porous sheet 21.

Further, said floor covering material 61B as shown in FIG. 13 (b) had a structure wherein said sound absorbing material 11 was inserted between said air-permeable porous sheets 21 and 22, and said carpet 7 was arranged on said air-permeable porous sheet 21 side, and said floor covering material 61d as shown in FIG. 13 (d) had a structure wherein a pair of said sound absorbing materials 11, 11 were arranged on both sides of said air-permeable porous sheet 22, and said carpet 7 was arranged on one of said sound absorbing materials 11, 11.

EXAMPLE 10

A fiber mixture web containing 70% by mass of a porous polyacrylonitril fiber manufactured by the method described in Tokkai Hei 5-311508 Official Gazette, said porous fiber having a fineness of 3.0 dtex, and 30% by mass of a low melting point polyester (melting point 140° C.) was heated at 180° C. for one minute after which said fiber mixture web was then passed through a cooling roll to manufacture a sound absorbing material, which was a fiber sheet, having a unit weight of 25 g/m², and an airflow resistance of 0.158 kPa·s/m. Next, an uncured phenol resin was coated onto a glass wool green web sheet having a unit weight of 500 g/m² in a coating amount of 20% by mass of said green web sheet, then said sound absorbing material was put onto one side of said green web sheet. The resulting laminated material was then molded into a prescribed shape by hot-pressing at 200° C. for one minute, to manufacture a molded multilayered sound absorbing material.

The airflow resistance of the resulting molded multilayered sound absorbing material was, though varying by area, in the range of between 0.6 and 3.0 kPa·s/m, said molded multilayered sound absorbing material having an excellent sound absorbing performance.

EXAMPLE 11

A porous polyester fiber having a fineness of 2.2 dtex was produced by dispersing 30% by mass of a zinc oxide into a melted polyester, and then melt spinning said melted polyester, into which said zinc oxide was dispersed, to make a polyester fiber in which zinc oxide was mixed, then dipping said polyester fiber into which said zinc oxide was mixed into a caustic soda water solution (PH 13.5) to elute the zinc oxide in the water, and washing said polyester fiber to remove the caustic soda from said polyester fiber, and then drying said polyester fiber after washing. Said porous polyester fibers were cut short with each short fiber having an average length of 3.0 mm, after which said short fibers were then mixed into said pulp fiber material used in EXAMPLE 3 in an amount of 20% by mass. A sound absorbing material which was a fiber sheet having a unit weight of 20 g/m² and an airflow resistance of 0.436 kPa·s/m was manufactured by the paper making of the resulting fiber mixture material.

Next, a cobweb-like hotmelt adhesive layer, made from a polyamide copolymer, having a melting point of 125° C. as a porous hotmelt adhesive layer, was put onto the backside of a porous sheet, which was a needle punched nonwoven fabric made from a polyester fiber, having a unit weight of 60 g/m².

Said sound absorbing material and said porous sheet were then laminated together through said air-permeable hotmelt adhesive layer, after which the resulting laminated material was then heated at 150° C. to adhere said sound absorbing material to said porous sheet, and manufacture a surface material, which was a multilayered sound absorbing material, having an airflow resistance of 0.476 kPa·s/m.

The resulting surface material was then put onto the surface of an air-permeable foamed melamine resin as a porous base sheet through a porous hotmelt adhesive layer after which the resulting laminated material was then molded by hot pressing into a prescribed shape at 180° C., to manufacture a sound absorbing interior finishing material.

The airflow resistance of the resulting interior finishing material was, though varying by area, in the range of between 3.0 and 5.5 kPa·s/m, said interior finishing material being useful as a sound absorbing automotive interior finishing material, having an excellent sound absorbing performance.

EXAMPLE 12

A fiber mixture web consisting of 5% by mass of a polyester fiber web (fitness 1.2 dtex, fiber length 75 mm) as a common fiber (non porous fiber), 15% by mass of a low melting point polyester fiber (fineness 1.7 dtex, fiber length 74 mm, melting point 140° C.) and 80% by mass of said porous polyester fiber (fineness 2.2 dtex, fiber length 65 mm) from EXAMPLE 11, was heated at 180° C., after which said fiber mixture web was passed through a cooling roll to manufacture a sound absorbing material, which was a fiber sheet, having a unit weight of 50 g/m², a thickness of 0.2 mm, and an airflow resistance of 0.203 kPa·s/m.

A pair of porous sheets made from a polyester fiber with a thickness of 5 mm and a unit weight of 300 g/m² respectively were put onto both sides of said sound absorbing material through the porous hotmelt adhesive layer used in EXAMPLE 11, after which the resulting laminated material was heated in a constant temperature device at 150° C. with sucking to manufacture a multilayered sound absorbing material having a thickness of 10 mm.

The airflow resistance of the resulting multilayered sound absorbing material was 0.337 kPa·s/m, said multilayered sound absorbing material has an excellent sound absorbing performance, being useful as for instance, a sound absorbing material attached to the wall of the building.

Possibility Of Industrial Use

Said sound absorbing material of the present invention is light weight and has an excellent sound absorbing performance, so that said sound absorbing material can be especially useful as an automotive interior finishing material. Accordingly the present invention can be industrially used.

The invention claimed is:

1. A multilayered sound absorbing material comprising a sound absorbing material and a porous sheet wherein said sound absorbing material consists of a fiber sheet made of fibers containing at least 50% by mass of a porous fiber having many minute pores, each minute pore opening onto the surface of said fiber, said sound absorbing material having a unit weight in the range of between 10 and 50 g/m² and an airflow resistance in the range of between 0.05 and 3.0 kPa·s/m, wherein said porous fiber is a porous pulp fiber having a beating or refining degree in the range of between 350 and 650 ml on the basis of Canadian Standard Freeness (CFS) provided in JIS P 8121-1995-4 Canadian Standard Freeness, or in the range of between 15 and 30° SR on the basis of Schopper-Riegler Freeness provided in JIS P 8121-1995-5 Schopper-Riegler Type Freeness Test Method, and said fiber sheet has contraction and expansion properties by carrying out crepe processing on said fiber sheet to provide a crepe processed fiber sheet having a creping degree in the range of between 10 and 50%, or carrying out embossing on said fiber sheet to provide an embossed fiber sheet having many projections, the height of each projection being in the range of between 0.02 and 2.00mm, with the number of said projections being between 20 and 200 projections/cm² and said porous sheet consists of a fiber sheet in which a thermoplastic fiber having a melting point below 180° C. is partially or wholly used and said sound absorbing material and said porous sheet are bonded together by an air-permeable hotmelt adhesive layer to secure the air-permeability of the resulting mutilayered sound absorbing material.

2. A multilayered sound absorbing material in accordance with claim 1, wherein the air-flow resistance of said fiber sheet is adjusted by coating or impregnating or mixing a synthetic resin or a synthetic resin precursor on or into said fiber sheet.

3. A multilayered sound absorbing material in accordance with claim 1, wherein said fiber sheet covers an under layer and is appropriately colored to conceal the color of the under layer which said fiber sheet covers.

4. A multilayered sound absorbing material in accordance with claim 1, wherein said fiber sheet(s), which is (are) sound absorbing material(s), is (are) laminated onto one or both sides of a porous sheet.

5. A multilayered sound absorbing material in accordance with claim 1, wherein porous sheets are laminated on both sides of said fiber sheet, which is sound absorbing material.

6. A multilayered sound absorbing material in accordance with claim 4, wherein the airflow resistance of the multilayered sound absorbing material is in the range of between 0.08 and 6.0 kPa·s/m.

7. A multilayered sound absorbing material in accordance with claim 4, wherein a synthetic resin or a synthetic resin precursor is (are) coated or impregnated or mixed on or into said porous sheet.

8. A molded multilayered sound absorbing material, wherein said multilayered sound absorbing material in accordance with claim 4 is molded into a prescribed shape.

9. A sound absorbing interior finishing material consisting of a laminated material, wherein said multilayered sound absorbing material in accordance with claim 4 is used as a surface material and said surface material is laminated onto the surface of a porous base sheet wherein the airflow resistance of said laminated material is set to be in the range of between 0.08 and 6.0 kPa·s/m.

10. A sound absorbing floor covering material consisting of a carpet, onto the backside of which said multilayered sound absorbing material in accordance with claim 4 is laminated.

11. A multilayered sound absorbing material in accordance with claim 2, wherein said fiber sheet covers an under layer and is appropriately colored to conceal the color of the under layer which said fiber sheet covers.

12. A multilayered sound absorbing material in accordance with claim 2, wherein said fiber sheet(s), which is (are) sound absorbing material(s), is (are) laminated onto one or both sides of a porous sheet.

13. A multilayered sound absorbing material in accordance with claim 3, wherein said fiber sheet(s), which is (are) sound absorbing material(s), is (are) laminated onto one or both sides of a porous sheet.

14. A multilayered sound absorbing material in accordance with claim 5, wherein said fiber sheet and said porous sheet are bonded together through an air permeable adhesive layer, the airflow resistance of the resulting multilayered sound absorbing material being in the range of between 0.08 and 6.0 kPa·s/m.

15. A multilayered sound absorbing material in accordance with claim 5, wherein a synthetic resin and/or a synthetic resin precursor is (are) coated or impregnated or mixed on or into said porous sheet.

16. A multilayered sound absorbing material in accordance with claim 6, wherein a synthetic resin or a synthetic resin precursor is (are) coated or impregnated or mixed on or into said porous sheet.

17. A molded multilayered sound absorbing material, wherein said multilayered sound absorbing material in accordance with claim 5 is molded into a prescribed shape.

18. A molded multilayered sound absorbing material, wherein said multilayered sound absorbing material in accordance with claim 6 is molded into a prescribed shape.

19. A sound absorbing interior finishing material consisting of a laminated material, wherein said multilayered sound absorbing material in accordance with claim 8 is used as a surface material and said surface material is laminated onto the surface of a porous base sheet wherein the airflow resistance of said laminated material is set to be in the range of between 0.08 and 6.0 kPa·s/m.

20. A sound absorbing floor covering material consisting of a carpet, onto the backside of which said multilayered sound absorbing material in accordance with claim 8 is laminated.

\* \* \* \* \*